United States Patent
Akidau et al.

(10) Patent No.: US 10,037,187 B2
(45) Date of Patent: Jul. 31, 2018

(54) DATA FLOW WINDOWING AND TRIGGERING

(71) Applicant: Google Inc., Mountain View, CA (US)

(72) Inventors: Tyler Akidau, Seattle, WA (US); Robert Bradshaw, Redmond, WA (US); Ben Chambers, Seattle, WA (US); Craig Chambers, Seattle, WA (US); Reuven Lax, Seattle, WA (US); Daniel Mills, Seattle, WA (US); Frances Perry, Seattle, WA (US)

(73) Assignee: Google LLC, Mountain View, CA (US)

( * ) Notice: Subject to any disclaimer, the term of this patent is extended or adjusted under 35 U.S.C. 154(b) by 219 days.

(21) Appl. No.: 14/931,006

(22) Filed: Nov. 3, 2015

(65) Prior Publication Data

US 2016/0285711 A1    Sep. 29, 2016

Related U.S. Application Data

(60) Provisional application No. 62/201,441, filed on Aug. 5, 2015, provisional application No. 62/074,272, filed on Nov. 3, 2014.

(51) Int. Cl.
*G06F 7/00* (2006.01)
*H04L 12/70* (2013.01)
*H04L 12/841* (2013.01)

(52) U.S. Cl.
CPC .............. *G06F 7/00* (2013.01); *H04L 47/00* (2013.01); *H04L 47/28* (2013.01)

(58) Field of Classification Search
CPC ....................................................... G06F 7/00

USPC ......................................................... 709/224
See application file for complete search history.

(56) References Cited

U.S. PATENT DOCUMENTS

| | | | |
|---|---|---|---|
| 5,577,213 A * | 11/1996 | Avery ................... | G06F 13/385 709/234 |
| 5,737,766 A * | 4/1998 | Tan ..................... | H03K 19/1736 365/189.08 |
| 7,334,247 B1 * | 2/2008 | Finseth ................ | G06T 1/0021 725/21 |
| 8,160,968 B2 * | 4/2012 | Rhoads .................. | G06F 21/10 235/380 |
| 8,416,983 B1 * | 4/2013 | Joseph ............. | H04N 21/44204 382/100 |
| 9,514,214 B2 * | 12/2016 | Chandramouli .. | G06F 17/30598 |
| 9,626,411 B1 * | 4/2017 | Chang ............... | G06F 17/30463 |
| 2003/0021439 A1 * | 1/2003 | Lubin ................... | G06T 1/0071 382/100 |
| 2004/0064702 A1 * | 4/2004 | Yu ......................... | G06T 1/0028 713/176 |

(Continued)

OTHER PUBLICATIONS

Sandu, "Real time vs. streaming—a short explanation", 2016.*

(Continued)

*Primary Examiner* — O. C. Vostal
(74) *Attorney, Agent, or Firm* — Honigman Miller Schwartz and Cohn LLP

(57) ABSTRACT

A method includes receiving data corresponding one of streaming data or batch data and a content of the received data for computation. The method also includes determining an event time of the data for slicing the data, determining a processing time to output results of the received data, and emitting at least a portion of the results of the received data based on the processing time and the event time.

22 Claims, 12 Drawing Sheets

(56) References Cited

U.S. PATENT DOCUMENTS

| | | | |
|---|---|---|---|
| 2005/0027500 A1* | 2/2005 | Cornhill | G06F 9/455 703/13 |
| 2006/0101269 A1* | 5/2006 | Moskowitz | G06F 21/10 713/176 |
| 2006/0117234 A1* | 6/2006 | Miyake | H03K 19/17764 714/725 |
| 2006/0259774 A1* | 11/2006 | Swoboda | G06F 11/3648 713/176 |
| 2008/0232363 A1* | 9/2008 | Wang | H04L 63/0428 370/389 |
| 2009/0089427 A1* | 4/2009 | Moskowitz | G06F 21/10 709/225 |
| 2009/0125563 A1* | 5/2009 | Wong | G06F 17/30566 |
| 2010/0057231 A1* | 3/2010 | Slater | G10L 19/018 700/94 |
| 2010/0306675 A1* | 12/2010 | Castelli | H04L 12/1822 715/757 |
| 2013/0132729 A1* | 5/2013 | Arnold | G06T 1/0071 713/176 |
| 2013/0297737 A1* | 11/2013 | Wajs | G06F 21/10 709/217 |
| 2014/0317653 A1* | 10/2014 | Mlodzinski | H04N 21/812 725/32 |
| 2014/0359425 A1* | 12/2014 | van der Molen | G06F 17/30592 715/234 |
| 2015/0066646 A1* | 3/2015 | Sriharsha | G06Q 30/0256 705/14.54 |
| 2015/0193899 A1* | 7/2015 | Oztaskent | H04N 19/46 382/100 |
| 2015/0381549 A1* | 12/2015 | Word | H04L 67/42 709/203 |
| 2017/0206004 A1* | 7/2017 | De Bruyn | G06F 3/04886 |

OTHER PUBLICATIONS

Wikipedia, "Streaming media", 2017.*
Zaharia et al., "Discretized Streams: An Efficient and Fault-Tolerant Model for Stream Processing on Large Clusters", 2012.*
Akidau et al., "MillWheel: Fault-Tolerant Stream Processing at Internet Scale", 2013.*
Chang et al., "Bigtable: A Distributed Storage System for Structured Data", 2006.*
Dictionary, "aggregate" 2018.*
Ghemawat et al., "The Google File System", 2003.*
Merriam-Webster, "aggregate", 2018.*
Zaharia et al., "Descretized Streams: An Efficient and Fault-Tolerant Model for Stream Processing on Large Clusters", 2013.*
Tyler Akidau et al: "MillWheel", Proceedings of the VLDB Endowment, vol. 6. No. 11, pp. 1033-1044, Aug. 27, 2013, New York, NY.
International Search Report and Written Opinon for the related PCT Application No. PCT/US2016/038131 dated Sep. 28, 2016.

* cited by examiner

DATA FLOW WINDOWING AND TRIGGERING

CROSS REFERENCE TO RELATED APPLICATIONS

This U.S. patent application claims priority under 35 U.S.C. § 119(e) to U.S. Provisional Application 62/074,271, filed Nov. 3, 2014, and U.S. Provisional Application 62/201,441, filed Aug. 5, 2015. The disclosures of these prior applications are considered part of the disclosure of this application and are hereby incorporated by reference in their entireties.

TECHNICAL FIELD

This disclosure relates to data flow windowing and triggering.

SUMMARY

One aspect of the disclosure provides a method for data flow windowing and triggering. The method includes receiving data corresponding one of streaming data or batch data at data processing hardware, determining, using the data processing hardware, a content of the received data for computation, determining, using the data processing hardware, an event time of the data for slicing the data, and determining a processing time to output results of the received data using the data processing hardware. The method also includes emitting at least a portion of the results of the received data based on the processing time and the event time.

Implementations of the disclosure may include one or more of the following optional features. In some implementations, the method includes grouping, using the data processing hardware, the received data windows based on the event time. The windows may include one of fixed windows, defined by a static time period, sliding windows defined by a time period and a slide period, session windows defined by a timeout gap, or user-defined windows defined by a pair of functions. Each fixed window may be applied across all of the data within the associated time period. Each sliding window may be applied across all of the data within the associated time period and associated with a start time separated from a start time of an immediately successive window by the slide period. Moreover, each session window may be applied across a subset of the data occurring within a span of time less than the associated timeout gap. In some examples, the method includes assigning, using the data processing hardware, a mergeable window for each element of the received data, each element including an associated input timestamp and each mergeable window extending a predefined range of time beyond the input timestamp for the associated window. The method may also include merging, using the data processing hardware, two or more of the mergeable windows belonging to a same key that overlap into a single merged window, and setting, using the data processing hardware, an associated output timestamp for each element to a value greater than or equal to an earliest time in the associated merged window or the associated mergeable window. The single merged window may include an associated range of time greater than the predefined range of time.

When the received data corresponds to streaming data, the method may include grouping, using the data processing hardware, the streaming data into windows and setting, using the data processing hardware, an input timestamp on an element of the streaming data. When the input timestamp on the element occurs earlier than a watermark, the method may include determining, using the data processing hardware, the streaming data including late streaming data, and one of dropping the late streaming data or allowing the late streaming data by creating a duplicate window in an output for the late streaming data.

In some examples, the method includes grouping, using the data processing hardware, a first subset of the received data into a window, the window defining a sub-event time of the data subset, aggregating, using the data processing hardware, a first result of the first data subset for the window, and determining, using the data processing hardware, a trigger time to emit the first aggregated result of the first data subset. The trigger time may include at least one of: when a watermark reaches an end of the window; every threshold number of seconds of a walltime; after receiving a punctuation record that terminates the window; every threshold number of records; after arbitrary user logic decides to trigger; or after an arbitrary combination of concrete triggers.

When determining the trigger time to emit the first aggregated result of the first data subset, the method may include discarding, using the data processing hardware, the first aggregated result from use when aggregating results of later subsets of the received data. When determining the trigger time to emit the first aggregated result of the first data subset, the method may also include storing a copy of the first aggregated result in a persistent state within memory hardware in communication with the data processing hardware, and refining, by the data processing hardware, a next aggregate result of a later subset with the first aggregated result. When determining the trigger time to emit the first aggregated result of the first data subset, the method may further include storing a copy of the first aggregated result in a persistent state within memory hardware in communication with the data processing hardware. When a next aggregated result of a later subset is associated with the same window emits, the method may include emitting a retraction of the first aggregated result and emitting a combined session result for the window.

In some implementations, the method includes receiving, at the data processing hardware, a late data point after grouping the first data subset into the window, the late data point related to the window, and discarding, using the data processing hardware, the late data point. The method may also include receiving, at the data processing hardware, a late data point after grouping the first data subset into the window, the late data point related to the window, and accumulating, using the data processing hardware, the late data point into the window to refine the first aggregated result with the late data point. The method may further include receiving, at the data processing hardware, a late data point after grouping the first data subset into the window, the late data point related to the window, aggregating, using the data processing hardware, a combined result of the first data subset and the late data point, and emitting the combined result.

Another aspect of the disclosure provides a system for data flow windowing and triggering. The system includes data processing hardware and memory hardware in communication with the data processing hardware. The memory hardware stores instructions that when executed on the data processing hardware, cause the data processing hardware to perform operations. The operations include: receiving data corresponding to one of streaming data or batch data;

determining a content of the received data for computation; determining an event time of the data for slicing the data; determining a processing time to output results of the received data; and emitting at least a portion of the results of the received data based on the processing time and the event time.

This aspect may include one or more of the following optional features. In some examples, the operations further include grouping the received data into windows based on the event time. The windows include one of fixed windows defined by a static time period, sliding windows defined by a time period and a slide period, session windows defined by a timeout gap, or user-defined windows defined by a pair functions. Each fixed window may be applied across all of the data within the associated time period, each sliding window may be applied across all of the data within the associated time period and associated with a start time separated from a start time of an immediately successive window by the slide period, and each session window may be applied across a subset of the data occurring within a span of time less than the associated timeout gap.

The operations may further include assigning a mergeable window for each element of the received data, each element including an associated input timestamp and each mergeable window extending a predefined range of time beyond the input timestamp for the associated window. The operations may also include merging two or more of the mergeable windows belonging to a same key that overlap into a single merged window and setting an associated output timestamp for each element to a value greater than or equal to an earliest time in the associated merged window or the associated mergeable window. The single merged window may include an associated range of time greater than the predefined range of time.

When the received data corresponds to streaming data, the operations may further include grouping, using the data processing hardware, the streaming data into windows and setting, using the data processing hardware, an input timestamp on an element of the streaming data. When the input timestamp on the element occurs earlier than a watermark, the operations may include determining, using the data processing hardware, the streaming data comprises late streaming data, and one of: dropping the late streaming data or allowing the late streaming data by creating a duplicate window in an output for the late streaming data.

In some examples, the operations further include grouping a first subset of the received data into a window, the window defining a sub-event time of the data subset, aggregating a first result of the first data subset for the window, and determining a trigger time to emit the first aggregated result of the first data subset. The trigger time may include at least one of: when a watermark reaches an end of the window; every threshold number of seconds of a walltime; after receiving a punctuation record that terminates the window; every threshold number of records; after arbitrary user logic decides to trigger; or after an arbitrary combination of concrete triggers.

When determining the trigger time to emit the first aggregated result of the first data subset, the operations may include discarding the first aggregated result from use when aggregating results of later subsets of the received data. When determining the trigger time to emit the first aggregated result of the first data subset, the operations may also include storing a copy of the first aggregated result in a persistent state within memory hardware in communication with the data processing hardware, and refining a next aggregate result of a later subset with the first aggregated result. When determining the trigger time to emit the first aggregated result of the first data subset, the operations may further include storing a copy of the first aggregated result in a persistent state within memory hardware in communication with the data processing hardware. When a next aggregated result of a later subset is associated with the same window emits, the operations may include emitting a retraction of the first aggregated result and emitting a combined session result for the window.

In some examples, the operations include receiving a late data point after grouping the first data subset into the window, the late data point related to the window, and discarding the late data point. The operations may also include receiving a late data point after grouping the first data subset into the window, the late data point related to the window, and accumulating the late data point into the window to refine the first aggregated result with the late data point. The operations may further include receiving a late data point after grouping the first data subset into the window, the late data point related to the window, aggregating a combined result of the first data subset and the late data point, and emitting the combined result.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1A:
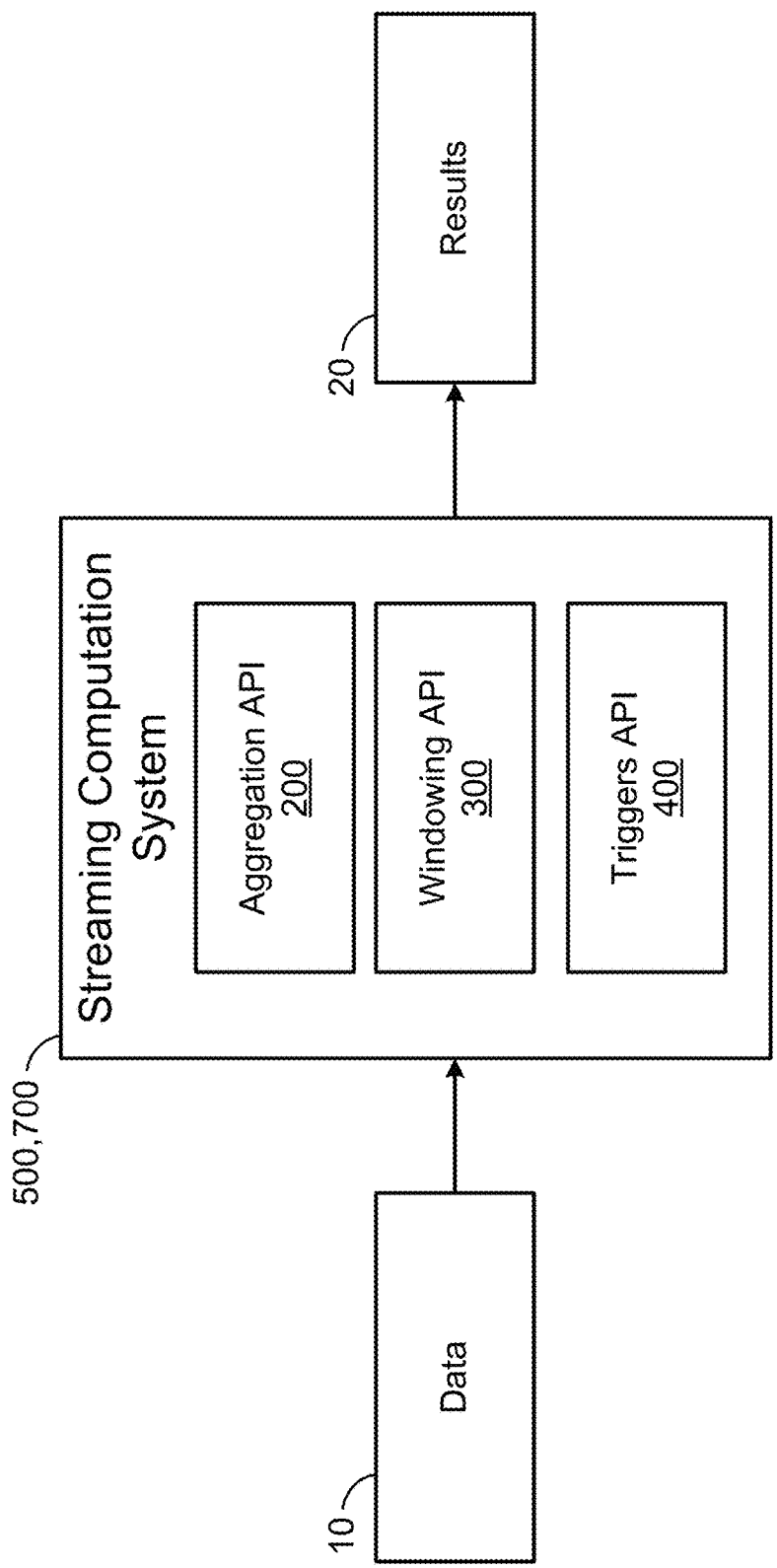
FIGS. 1A and 1B are schematic views of an example streaming computation system.

Batch data processing is the execution of programs (aka jobs) on a computer without manual intervention, i.e., without human intervention. The program parameters are pre-defined via scripts, command-line arguments, control files, or job control language. A program takes a set of data files as input, and then processes the data before producing a set of output files. The term "batch processing" refers to input data collected into batches or sets of records and each batch is processed as a unit. The output is also a batch that is reused for computations.

Large-scale batch data processing is known in the industry. A programmer writes code that describes some sort of computation, and then runs that code over a finite dataset to produce a result. If the computation in question happens to involve aggregation by time (e.g. grouping into fixed windows, or calculating per-user sessions), then the programmer either processes the data in window-sized batches (for simple cases like fixed windows), or the programmer incorporates the windowing logic into your computation logic (for complicated cases like user sessions). Time-based aggregation is actually relatively common, since it is very useful in analyzing user behavior patterns.

When a programmer is dealing with streaming data, which is a relatively new field compared to batch processing, the programmer has an essentially unbounded set of data over which he/she wants to perform a similar computation. But since the data lacks finite boundaries, the programmer needs to use either (1) online approximation algorithms (e.g., approximate Top N), or (2) determine a way to chop up the data stream into pieces.

Online approximation algorithms approach can be very useful for some applications, but since the results are approximate, they are not a complete replacement for the precise results of batch computations. As a result, the programmer ends up running both streaming and batch systems side-by-side (e.g., Lambda Architecture): streaming for low latency and batch for precise, repeatable results.

Chopping up the data stream into finite pieces yields the opportunity to calculate precise results in a streaming fashion. In addition to computing some aggregate, the programmer also has to solve the problem of where to slice up the data stream and when to emit the results. Most streaming systems take the approach of automatically chopping the data stream up into fixed windows based on the time the data arrives in the system (e.g., the programmer requests five-minute windows, and the programmer buffers up five minutes of data as it is received and then processes the data). This approach has two major downsides. A first downside, unlike the event-time based windows in most batch processing systems, which accurately reflect the times at which events happened, is that the walltime windows reflect only the time that data arrived in the system. In a healthy system, this will possibly be a reasonably close approximation of event time windows, but there is no guarantee of that, and when data is generated by a large set of disparate processes (e.g., a distributed set of web frontends), it is quite likely that the programmer will have times where huge swaths of data show up in an ordering that is not like the actual event time ordering. Thus, the programmer's streaming system becomes a low-latency approximation that must be backed up by a batch system to provide precise results. A second downside is that the windowing function applied to the data is the same across all data. Thus, the programmer has no way of generating customer windows for subsets of the data, e.g., per-user sessions that capture bursts of activity for a specific user. So the programmer can only support a subset of the use cases the programmer could in batch.

MillWheel (and now WindMill, the Dataflow streaming backend), which is a framework for building low-latency data-processing applications, seems to be the only streaming system that does not have the aforementioned limitations, based on its strong consistency guarantees and powerful API (Application programming interface). MillWheel's API allows the programmer to buffer data in arbitrary ways based on event time, emitting results whenever the programmer deems useful, including after periods of walltime like other systems, but also in a data driven manner (e.g., receipt of a punctuation record) or after the system believes all data up to a given event time has been received (watermarks/cursors). The programmer can build a streaming data processing system with MillWheel that calculates exact results and completely replaces a batch system generating the same output, but with much lower latency.

The big downside of the MillWheel API is that it is very low level. It provides all the right building blocks, but does not abstract them in a way that makes it easy for a programmer to write new computations, or compose existing libraries to build new computations. Flume is a distributed, reliable, and available service for efficiently collecting, aggregating, and moving large amounts of log data. Flume has a simple and flexible architecture based on streaming data flows. In addition, Flume architecture is much more high level than MillWheel architecture, making it very easy to link and compose computational building blocks into something powerful but understandable. However, the batch Flume API does not really fit well with the streaming paradigm, because it has no notion of how to chop up unbounded streams of data for processing. Therefore, there is a need for APIs that chop up unbounded streams of data for processing (and the underlying architecture that supports them).

Figure 1B:
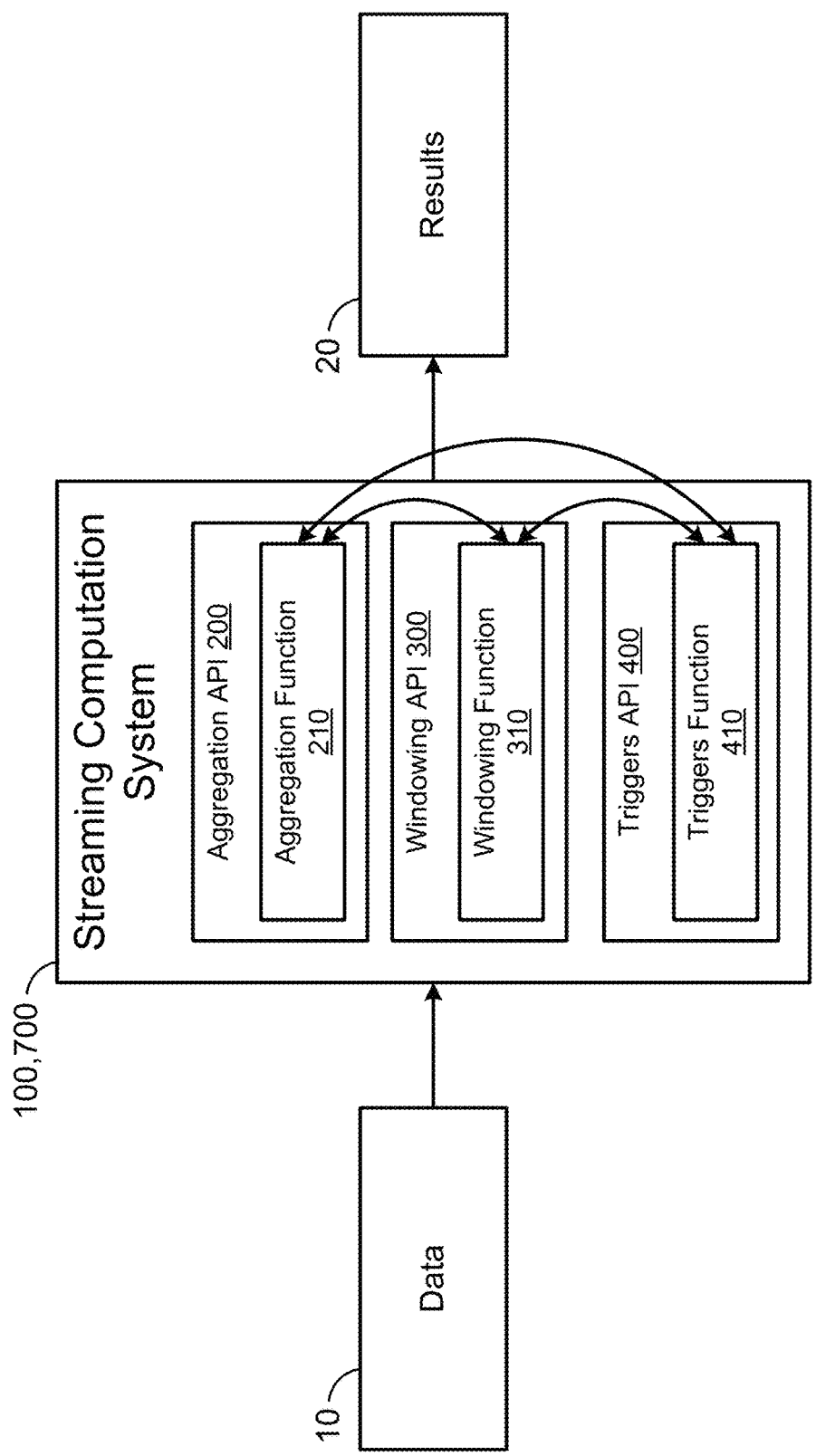

Referring to FIGS. 1A and 1B, in some implementations, a streaming computation system 100 includes an aggregation API 200, a windowing API 300, and a triggers API 400, where each API focuses on a separate portion of the streaming computation process.

The aggregation API 200 focuses on what the programmer is computing, for example, a sum, or a list of top N values. The windowing API 300 focuses on where (in event time) the programmer chooses to slice up the unbounded stream of data 10 (e.g., fixed windows 330 or sessions 350 (FIG. 3)). The triggers API 400 focuses on when (in processing time) the programmer chooses to emit the aggregate results 20 for a given window of data 10.

The aggregation API 200 is essentially the batch API that already exists in Flume. The programmer defines what computation to perform as data 10 comes in, and generate a result 20 in response thereto. The windowing API 300 allows the programmer to define which windows a given datum (from the entered data 10) falls into. Additionally, when grouping data 10 together by key (e.g. by user), the windowing API 300 allows the programmer to merge windows, which allows the programmer to build up dynamic, data-driven windows like sessions. The triggers API 400 then allows the programmer to define when the aggregate results 20 for a window are emitted. Examples might be: when the watermark has reached the end of the window (the canonical time-based aggregation model in MillWheel); every N seconds of walltime (e.g., for a system that cares more about freshness than completeness in results 20); after receiving a punctuation record that terminates the window; every threshold number of records; after arbitrary user logic decides to trigger; or any arbitrary combination of concrete triggers (e.g., initially when the watermark reaches the end of the window, and then once every minute any time late data 20 behind the watermark arrives, allowing for data 20 to be updated or changed after the fact).

Figure 7:
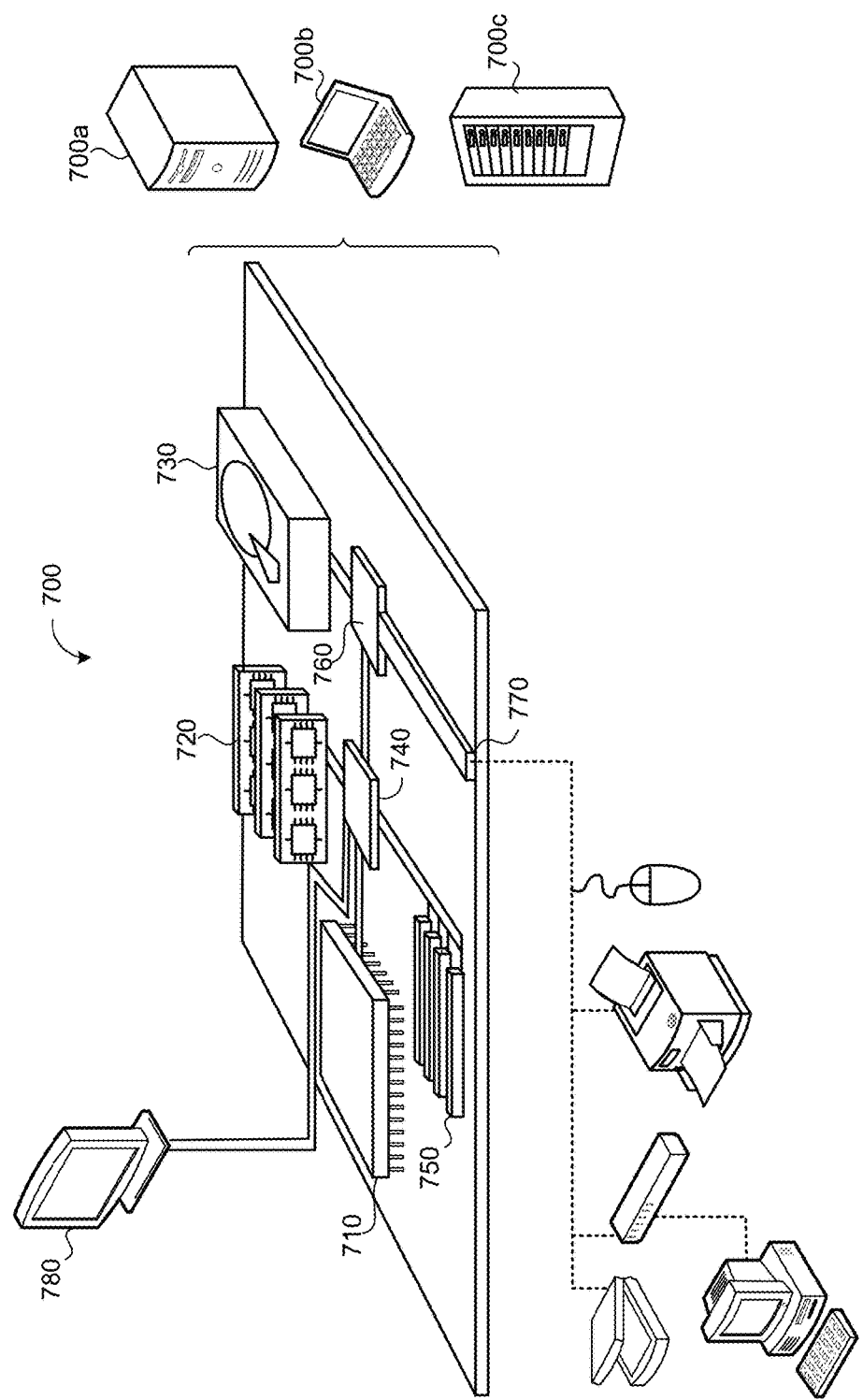
FIG. 7 is a schematic view of an example computing device executing any systems or methods described herein.

As far as expressiveness, the streaming computation system 100 provides implementation clarity, because when implementing a function for one of the three APIs 200, 300, 400, the programmer focuses simply on the specific task at hand (Aggregation, Windowing, or Triggering), which is an improvement over prior system such as MillWheel (and other systems), where the programmer has to conflate the three, leading to more complex code that is harder to read and maintain. The streaming computation system 100 may execute on data storage hardware 710 (FIG. 7) executing on a computing device 700 (FIG. 7). The streaming computation system 100 provides composability, because the programmer can mix and match functions from the three APIs 200, 300, 400 to get the precise type of computation needed. An aggregation function 210 to compute a sum can be used with a windowing function 310 to build sessions and a trigger function 410 to produce results 20 when the watermark reaches the end of the window. The same aggregation function 210 can be used to calculate sums over fixed windows of time, each containing ten records, just by changing the windowing and trigger functions 310, 410. Therefore, the streaming computation system 100 (which works in batch mode), allows a programmer to build complex, yet understandable and maintainable systems, that precisely calculate the results 20 that the programmer wants. Therefore, the programmer can write a code using the streaming computation system 100, and allow the system 100 to execute in streaming mode to get low latency results, or in batch mode to do massive scale backfills or perform some one-off calculations. Therefore, the system 100 provides multiple benefits including, but not limited to, decomposition of the streaming computation into three axes of what (aggregation API 200), where in event time (windowing API 300), and when (triggers API 400), with attendant APIs and (non-trivial) implementations, and unification of batch and streaming semantics under one common umbrella.

Figure 2:
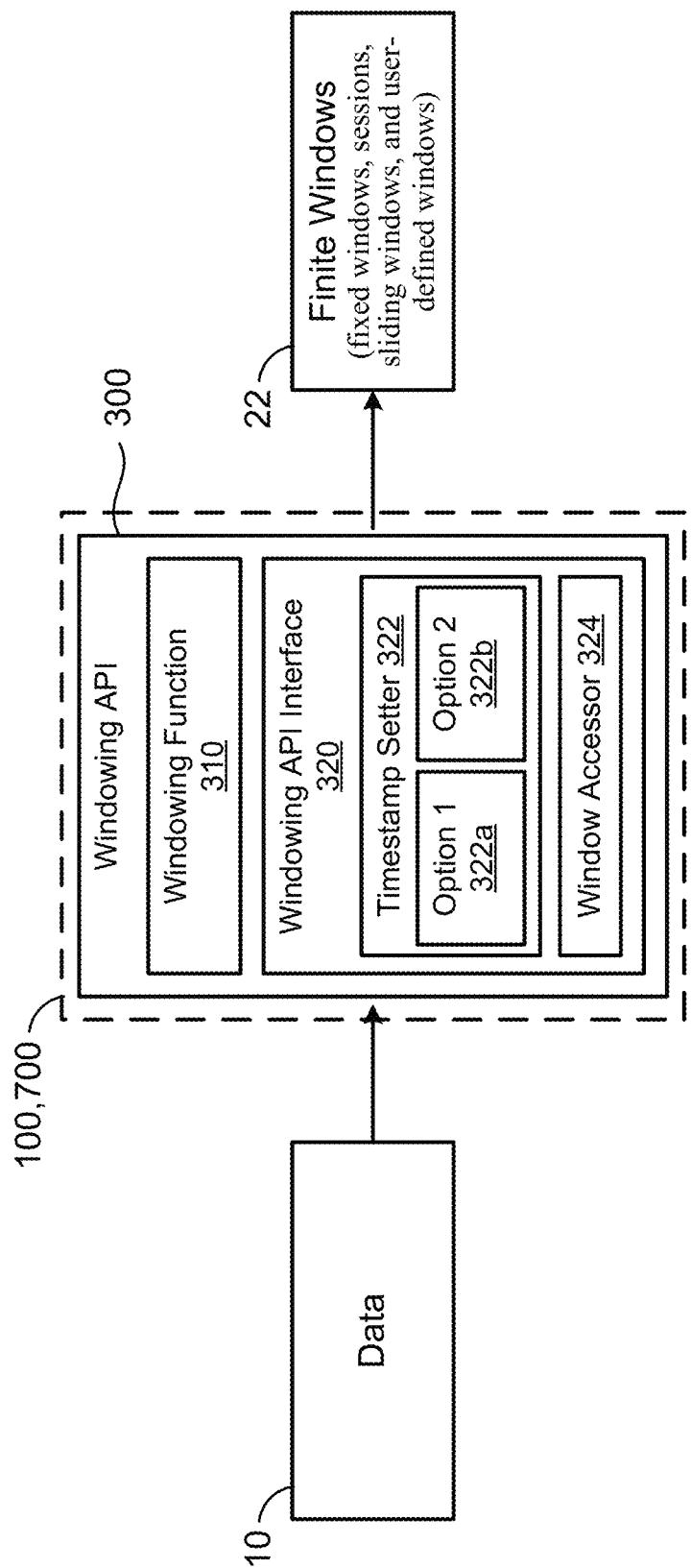
FIG. 2 is a schematic view of an example windowing Application Programming Interface (API) of the streaming computation system of FIG. 1.
Figure 3:
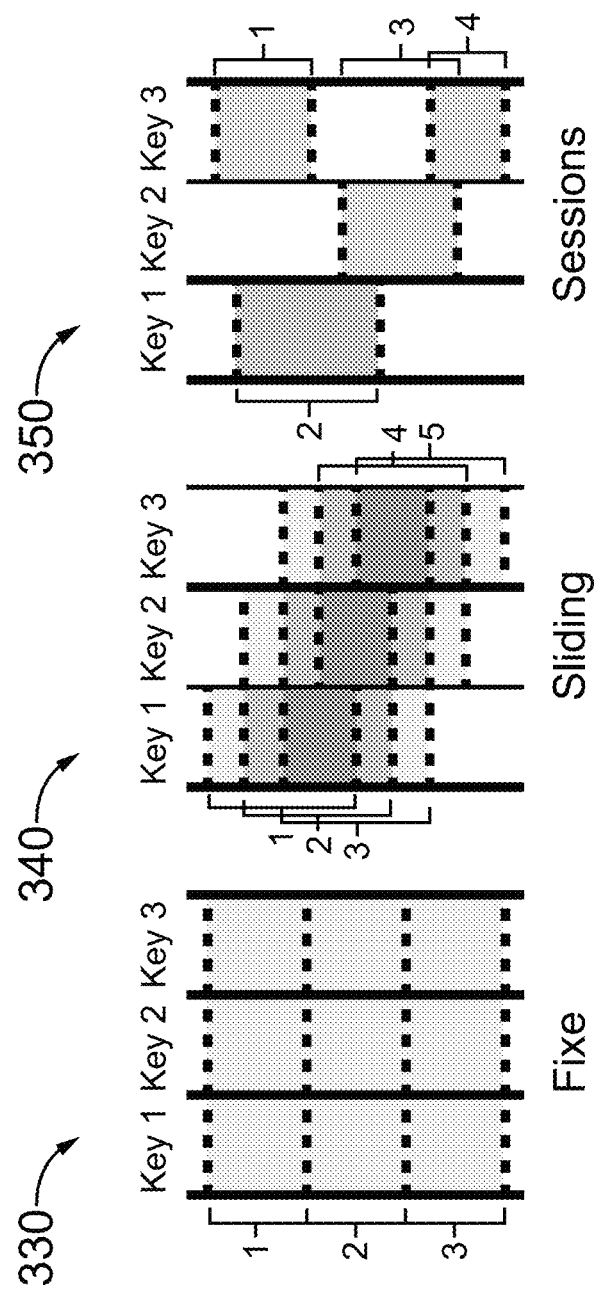
FIG. 3 is an example of fixed, sliding, and session windows.

Windowing API 300:

Referring to FIG. 2, the windowing API 300 groups streaming data 10 into finite windows 22 (fixed windows 330, sessions 350, and sliding windows 340 (FIG. 3)) for further processing and aggregation. The windowing API 300 may also group streaming data 10 into user-defined windows defined by a pair of functions. The pair of functions may include (1) assignWindows to assign a given element to a set of windows; and (2) mergeWindows to optionally merge a specified subset of windows at grouping time. Windowing slices up a dataset 10 into finite chunks for processing as a group. When dealing with unbounded data 10, windowing is required for some operations (to delineate finite boundaries in most forms of grouping: aggregation, outer joins, time-bounded operations, etc.), and unnecessary for others (filtering, mapping, inner joins, etc.). For bounded data, windowing is essentially optional, though still a semantically useful concept in many situations (e.g. back-filling large scale updates to portions of a previously computed unbounded data source). Windowing is effectively always time based; while many systems support tuple-based windowing, this is essentially time-based windowing over a logical time domain where elements in order have successively increasing logical timestamps. Windows may be either aligned, i.e. applied across all the data for the window of time in question, or unaligned, i.e. applied across only specific subsets of the data (e.g. per key) for the given window of time. FIG. 3 highlights three of the major types of windows encountered when dealing with unbounded data.

Fixed windows 330 (sometimes called tumbling windows) are defined by a static window size, e.g. hourly windows or daily windows. They are generally aligned, i.e. every window applies across all of the data 10 for the corresponding period of time. For the sake of spreading window completion load evenly across time, they are sometimes unaligned by phase shifting the windows for each key by some random value.

Sliding windows 320 are defined by a window size and slide period, e.g. hourly windows starting every minute. The period may be less than the size, which means the windows may overlap. Sliding windows are also typically aligned; even though the diagram is drawn to give a sense of sliding motion, all five windows would be applied to all three keys in the diagram, not just Window 3. Fixed windows are really a special case of sliding windows where size equals period.

Sessions 330 are windows that capture some period of activity over a subset of the data, in this case per key. Typically they are defined by a timeout gap. Any events that occur within a span of time less than the timeout are grouped together as a session. Sessions are unaligned windows. For example, Window 2 applies to Key 1 only, Window 3 to Key 2 only, and Windows 1 and 4 to Key 3 only.

When processing data 10 which relate to events in time, there are two inherent domains of time to consider. The two domains of interest are, Event Time and Processing Time. Event Time is the time at which the event itself actually occurred, i.e. a record of system clock time (for whatever system generated the event) at the time of occurrence. Processing Time is the time at which an event is observed at any given point during processing within the pipeline, i.e. the current time according to the system clock. Note that we make no assumptions about clock synchronization within a distributed system.

Event time for a given event essentially never changes, but processing time changes constantly for each event as it flows through the pipeline and time marches ever forward. This is an important distinction when it comes to robustly analyzing events in the context of when they occurred.

During processing, the realities of the systems in use (communication delays, scheduling algorithms, time spent processing, pipeline serialization, etc.) result in an inherent and dynamically changing amount of skew between the two domains. Global progress metrics, such as punctuations or watermarks, provide a good way to visualize this skew. For our purposes, we'll consider something like MillWheel's watermark, which is a lower bound (often heuristically established) on event times that have been processed by the pipeline. Notions of completeness are generally incompatible with correctness, so watermarks are not relied on as such. Watermarks do, however, provide a useful notion of when the system thinks it likely that all data up to a given point in event time have been observed, and thus find application in not only visualizing skew, but in monitoring overall system health and progress, as well as making decisions around progress that do not require complete accuracy, such as basic garbage collection policies.

Figure 4:
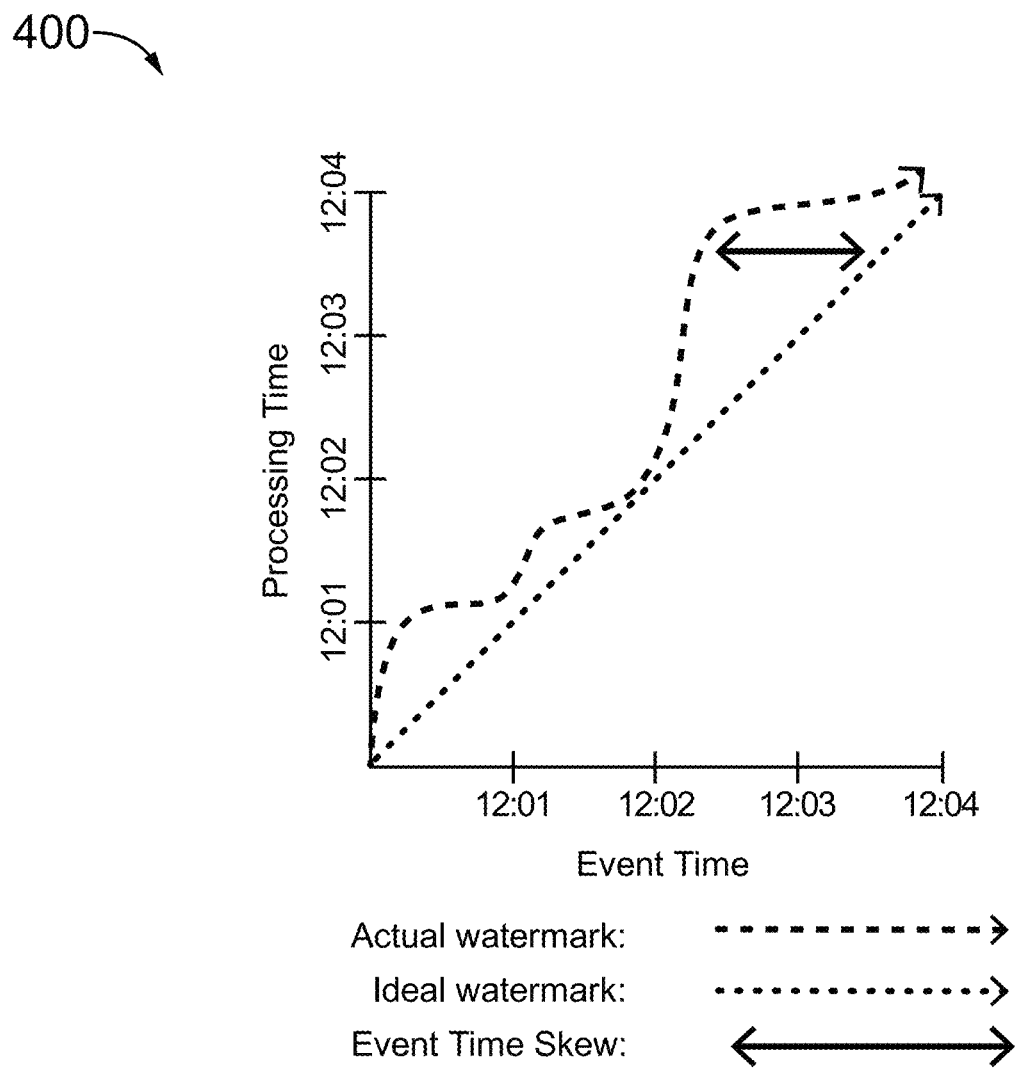
FIG. 4 is an example plot of a window time domain skew.

In an ideal world, time domain skew would always be zero and the processing of events would occur immediately as they happen. Reality is not so favorable, however, and often results in a non-zero time domain skew. FIG. 4 shows an example time domain skew where the X-axis denotes "event time" and the Y-axis denotes "processing time". Starting around 12:00, an actual watermark starts to skew more away from an ideal watermark as the pipeline lags, diving back close to the ideal water mark at event time around 12:02, then lagging behind again noticeably by the time 12:03 rolls around. This dynamic variance in skew is very common in distributed data processing systems, and will play a big role in defining what functionality is necessary for providing correct, repeatable results.

The formal model for the system is explained and its semantics are general enough to subsume the standard batch, micro-batch, and streaming models, as well as the hybrid streaming and batch semantics of the Lambda Architecture. For code examples, we will use a simplified variant of the Dataflow Java SDK, which itself is an evolution of the FlumeJava API.

To begin with, let us consider primitives from the classic batch model. The Dataflow SDK has two core transforms that operate on the (key, value) pairs flowing through the system ParDo and GroupByKey.

ParDo is for generic parallel processing. Each input element to be processed (which itself may be a finite collection) is provided to a user-defined function (called a DoFn in Dataflow), which can yield zero or more output elements per input. For example, consider an operation which expands all prefixes of the input key, duplicating the value across them:

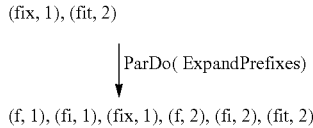

GroupByKey is for key-grouping (key, value) pairs. As for example operation.

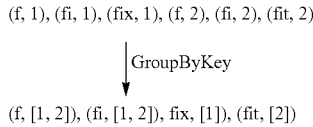

The ParDo operation operates element-wise on each input element, and thus translates naturally to unbounded data. The GroupByKey operation, on the other hand, collects all data for a given key before sending them downstream for reduction. If the input source is unbounded, we have no way of knowing when it will end. The common solution to this problem is to window the data.

Systems which support grouping typically redefine their GroupByKey operation to essentially be GroupByKeyAndWindow. Our primary contribution here is support for unaligned windows, for which there are two key insights. The first is that it is simpler to treat all windowing strategies as unaligned from the perspective of the model, and allow underlying implementations to apply optimizations relevant to the aligned cases where applicable. The second is that windowing can be broken apart into two related operations:

Set<Window>AssignWindows(T datum), which assigns the element to zero or more windows.

Set<Window>MergeWindows(Set<Window>windows), which merges windows at grouping time. This allows data-driven windows to be constructed over time as data arrive and are grouped together.

For any given windowing strategy, the two operations are intimately related; sliding window assignment requires sliding window merging, sessions window assignment requires sessions window merging, etc.

Note that, to support event-time windowing natively, instead of passing (key, value) pairs through the system, we now pass (key, value, event time, window) 4-tuples. Elements are provided to the system with event-time timestamps (which may also be modified at any point in the pipeline), and are initially assigned to a default global window, covering all of event time, providing semantics that match the defaults in the standard batch model.

From the system perspective, window assignment creates a new copy of the element in each of the windows to which it has been assigned. For example, consider windowing a dataset by sliding windows of two-minute width and one-minute period, as shown below (for brevity, timestamps are given in HH:MM format).

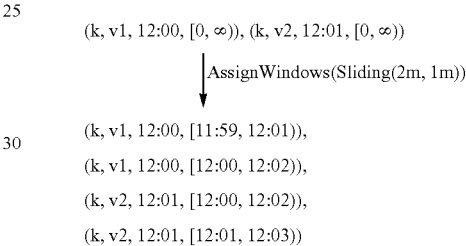

In this case, each of the two (key, value) pairs is duplicated to exist in both of the windows that overlapped the element's timestamp. Since windows are associated directly with the elements to which they belong, window assignment may happen anywhere in the pipeline before grouping is applied. This is important, as the grouping operation may be buried somewhere downstream inside a composite transformation (e.g. Sum.integersPerKey( )).

Figure 5:
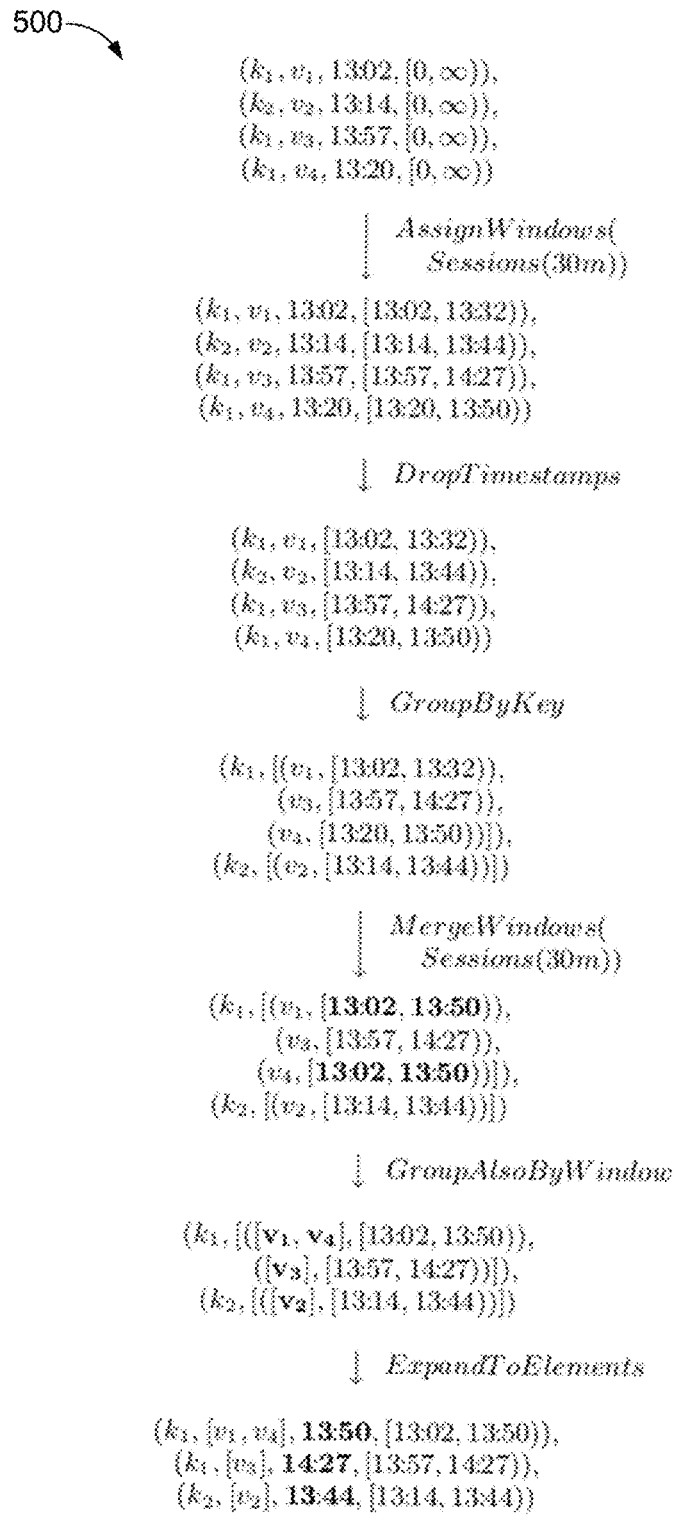
FIG. 5 is an example of a window merging operation.

Window merging occurs as part of the GroupByKeyAndWindow operation, and is best explained in the context of the example window merging operation of FIG. 5. FIG. 5 uses window sessions (also referred to as "session windowing") for four example data points, three for k1 and one for k2, as they are windowed by session, with a 30-minute session timeout. All are initially placed in a default global window by the system. The sessions implementation of AssignWindows puts each element into a single window that extends 30 minutes beyond its own times-tamp; this window denotes the range of time into which later events can fall if they are to be considered part of the same session. Thereafter, the GroupByKeyAndWindow operation may commence, which is really a five-part composite operation:

DropTimestamps—Drops element timestamps, as only the window is relevant from here on out. GroupByKey—Groups (value, window) tuples by key. MergeWindows—Merges the set of currently buffered windows for a key. The actual merge logic is defined by the windowing strategy. In this case, the windows for v1 and v4 overlap, so the sessions windowing strategy merges them into a single new, larger session, as indicated in bold. GroupAlsoByWindow—For each key, groups values by window. After merging in the prior step, v1 and v4 are now in identical windows, and thus are grouped together at this step. ExpandToElements—Expands per-key, per-window groups of values into (key, value, event time, window) tuples, with new per-window timestamps. In this example, the timestamp is set to the end of the window, but any timestamp greater than or equal to the timestamp of the earliest event in the window is valid with respect to watermark correctness.

The following function of using windowing in practice to calculate keyed integer sums could be accomplished using the Cloud Dataflow SDK and the following:

PCollection<KV<String, Integer>>input=IO.read( . . . );

PCollection<KV<String, Integer>>output=input

.apply(Sum.integersPerKey( ));

A second example can be accomplished using windowed sessions with a 30-minute timeout as in FIG. 5 using a single window into call before imitating the summation as per the example below.

PCollection<KV<String, Integer>>input=IO.read( . . . );

PCollection<KV<String, Integer>>output=input

.apply(Window.into(Sessions.withGapDuration(Duration.standardMinutes(30))))

.apply(Sum.integersPerKey( ));

The windowing API 300 supports Cloud Dataflow for both streaming and batch modes. Windowing API semantics may include a high-level model of windowing such as, but not limited to, Window.into which assigns elements into a set of windows, and GroupByKey that treats the windows on the input elements as secondary keys, and so groups by (key, window) pairs. The following are windowing examples:

Notation:

<Datum, Timestamp, Window Set>

G is the global window, GBF is the global WindowingFn, $[t_1, t_2)$ is an Intervalbucket representing that time interval.

FixedWindows:

{<KV($k_1$,a), 0, G>, <KV($k_1$,b), 5 G>, <KV($k_1$,c), 15, G>, <KV($k_2$,d), 7, G>}

Windowed by: GBF

↓

Window.into(FixedWindows.of(10))

↓

{<KV($k_1$,a), 0, {[0, 10)}>, <KV($k_1$,b), 5, {[0, 10)}>, <KV($k_1$,c), 15, {[10, 20)}>, <KV($k_2$,d), 7, {[0, 10)}>}

Windowed by: FixedWindows.of(10)

↓

GroupByKeyAndWindows

↓

{<KV($k_1$,[a,b]), 9, {[0, 10)}>, <KV($k_1$,[c]), 19, {[0, 20)}>, <KV($k_2$,[d]), 9, {[0, 10)}>}

Windowed by: FixedWindows.of(10)

Sliding Windows:

{<KV($K_1$,a), 10, G>, <KV($K_1$,b), 15, G>, <KV($k_1$,c), 25, G>, <KV($k_2$,d), 17, G>}

Windowed by: GBF

↓

Window.into(SlidingWindows.of(20).every(10))

↓

{<KV($K_1$,a), 10, {[0, 20), [10, 30)}>, <KV($K_1$,b), 15, {[0, 20), [10, 30)}>, <KV($K_1$,c), 25, {[10, 30), [20, 40)}>, <KV($K_2$,d), 17, {[0, 20), [10, 30)}>}

Windowed by: SlidingWindows.of(20).every(10)

↓

GroupByKeyAndWindows

↓

{<KV($k_1$,[a, b]), 19, {[0, 20)}>, <KV($k_1$,[a, b, c]), 29, {[10, 30)}>, <KV($k_1$,[c]), 39, {[20, 40)}>, <KV($K_2$,[d]), 19, {[0, 20)}>, <KV($k_2$,[d]), 29, {[10, 30)}>}

Windowed by: SlidingWindows.of(20).every(10)

Sessions:

{<KV($k_1$,a), 0, G>, <KV($k_1$,b), 5 G>, <KV($k_1$,c), 15, G>, <KV($k_2$,d), 7, G>}

Windowed by: GBF

↓

Window.into(Sessions.withGapSize(10))

↓

{<KV($k_1$,a), 0, {[0, 10)}>, <KV($k_1$,b), 5, {[5, 15)}>, <KV($k_1$,c), 15, {[15, 25)}>, <KV($k_2$,d), 7, {[7, 17)}>}

Windowed by: Sessions.withGapSize(10)

↓

GroupByKeyAndWindows

↓

{<KV($k_1$,[a,b]), 14, {[0, 15)}>, <KV($k_1$,[c]), 24, {[15, 25)}, <KV($k_2$,[d]), 16, {[7, 17)}>>}

Windows by: Sessions.withGapSize(10)

General Case, with SomeUnspecifiedCrazyWindowFn:

$\{<KV(K_1,a), t_a, G>, <KV(k_1,b), t_b, G>, <KV(k_1,c), t_c, G>, <KV(k_1,d), t_d, G>, <KV(k_2,e), t_e, G>\}$
Windowed by: GBF

↓

Window.into(SomeUnspecifiedCrazyWindowFn)

↓

$\{<KV(k_1,a), t_a, \{b_1,b_2\}>, <KV(k_1,b), t_b, \{b_1,b_3\}>, <KV(k_1,c), t_c, \{b_4\}>, <KV(k_1,d), t_d, \{\}>, <KV(k_2,e), t_e, \{b_1,b_2\}>\}$
Windowed by: SomeUnspecifiedCrazyWindowFn

↓

GroupByKeyAndWindows
(Assume $b_3$ and $b_4$ merge into $b_{3\text{-}4}$)

↓

$\{<KV(k_1,[a,b]), t(b_1, [t_a, t_b]), \{b_1\}>, <KV(k_1,[a]), t(b_2, [t_a]), \{b_2\}>, <KV(k_1,[b,c,]), t(b_{3\text{-}4}, [t_b,t_c]), \{b_{3\text{-}4}\}>, <KV(k_2,[e]), t(b_1, [t_e]), \{b_1\}>, <KV(k_2,[e]), t(b_2, [t_e]), \{b_2\}>\}$
Winowed by: SomeUnspecifiedCrazyWindowFn Details of GroupByKeyAndWindows: Input $\{<KV(k, v_1), t_1, \{b_1\}>, <KV(k, v_2), t_2, \{b_2\}>, <KV(k, v_3), t_3, \{b_3,b_4\}>\}$

↓

Erase timestamps, and group by key k ⟶ $\{<v_1, \{b_1\}>, <v_2, \{b_2\}>, <v_3, \{b_3,b_4\}>\}$

↓

Expand window sets k ⟶ $\{<v_1, b_1>, <v_2, b_2>, <v_3, b_3>, <v_3, b_4>\}$

↓

Merge windows. In this example, mapping is:

$b_1, b_3$ ⟶ $b_5$ $b_2$ ⟶ $b_6$ $b_4$ ⟶ $b_7$ k ⟶ $\{<v_1, b_5>, <v_2, b_6>, <v_3, b_5>, <v_3, b_7>\}$

↓

Group by windows k ⟶ $\{b_5$ ⟶ $[v_1,v_3], b_6$ ⟶ $[v_2], b_7$ ⟶ $[v_3]\}$

↓

Compute timestamps and convert to elements
$\{<KV(k, [v_1,v_3]), t(b_5), \{b_5\}>, <KV(k, [v_2]), t(b_6), \{b_6\}>, <KV(k, [v_3]), t(b_7), \{b_7\}>\}$ Referring back to FIG. 2, the windowing API 300 includes a windowing interface 320. The windowing interface 320 includes a timestamp setter function 322 and a window accessor function 324.

The timestamp setter function 322 updates the timestamp in step context before outputting the element. An example of the timestamp setter function 322 may include:

```
DoFnContext.outputWithTimestamp(O output, long timestamp);
{
    stepContext.getExecutionContext( ).setTimestamp(timestamp);
    output(output);
}
```

In both batch and streaming modes, it is useful to be able to set or modify the timestamps of elements in a PCollection (which is a representation of an immutable, distributed collection of elements that is the fundamental target of computation). In batch mode, it is safe to set timestamps arbitrarily; however, in streaming mode, setting a timestamp on an output element that is further in the past than the timestamp on its corresponding input element can produce late data (e.g., late data point(s)) that will not be properly processed by the rest of the pipeline.

There are two caveats to this rule in streaming: first, if a DoFn can provide a static bound on the amount by which it will shift timestamps backward, the programmer can hold up the watermark by that amount and still process the data correctly; second, sometimes producing late data is the desired behavior, and late data can be sensibly handled with triggers. Therefore, the system 100 provides two proposed APIs within the timestamp setter function 322 to handle timestamps shifting backward in streaming:

Option 1 322a: ask a user to provide how much the timestamps will be shifted backward.

```
// Returns the maximum amount by which an output timestamp can be less
than its corresponding input timestamp
long DoFn.lateDataHorizon( )
```

Option 2 322b: force users to set OutputTimestampMode if outputWithTimestamp is called in streaming.

```
// By default DoFn.getOutputTimestampMode returns
UNBOUNDED_PAST mode, which is not allowed in
DoFnContext.outputWithTimestamp for streaming mode.
class DoFn {
    public enum OutputTimestampMode {
        UNBOUNDED_PAST,
        BOUNDED_PAST,
        FURTURE;
    }
    public OutputTimestampMode getOutputTimestampMode( ) {
        return OutputTimestampMode.UNBOUNDED_PAST;
    }
}
// Outputs element with the specified timestamp.
```

```
// This can produce late data
DoFnContext.outputWithTimestamp(O output, long timestamp) {
    if (!outputTimestampModeChecked && options.streaming) {
        Preconditions.checkArgument (
            fn.getOutputTimestampMode( ) !=
            OutputTimestampMode.UNBOUNDED_PAST);
        outputTimestampModeChecked = true;
    }
    stepContext.getExecutionContext( ).setTimestamp(timestamp);
    output(output);
}
```

The window accessor function 324 (e.g., DoFn.ProcessContext.windows( )) is one way of accessing windows, but it really only makes sense to access them after a GroupByKey, and in that case, each element will only be in a single window.

The windowing API 300 uses triggers to handle late data. Without triggers, the windowing API 300 uses two possible methods to handle the late data. The windowing API 300 can drop late data that would not be grouped into the correct window, or the windowing API 300 can allow late data to create duplicate windows in the output of GroupByKeyAndWindows. The windowing API 300 can either pick one of the options, or allows the options to be configurable at either the pipeline level or on Window transforms (essentially resulting in a very poor approximation/subset of triggers).

Eagerness of MergeWindows:

In some examples, it may be difficult to make arbitrary window functions deterministic. Instead, the system 100 can quantify exactly when a window function is deterministic. A WindowingFn will be deterministic if whenever a window is ready to be emitted, any windows that it might merge with must already be known, and it must merge with all of them.

In some implementation, the system 100 provides batch support through shuffle. In some examples, the system 100 processes all KVs for a given key on the same worker following the logical time order of the element. Then, the worker can leverage the current streaming code, and process the data as if they are coming from streaming. The system 100 performs the following to support the batch through shuffle: 1) ShuffleSink encodes timestamp and windows into ShuffleEntry.value, and use the timestamp as the keys (sorting key). 2) Create a SortedShuffleSource reads all KVs for the same key, and return the result with the following interface:

SourceIterator<Reiterable<KV>>iterator(ShuffleEntryReader reader)

long SortedShuffleSourceIterator.ValuesIterator.getTimestamp( );

Collection<BoundedWindow>

SortedShuffleSourceIterator.ValuesIterator.getWindows( );

TODO: reusing code in GroupingShuffleSource.

The following is an exemplary user code that may be executed by the system 100:

```
.apply(TextIO.Read.named("ReadLines").from(options.input))
.apply(ParDo.named("ExtractWordsWithTimestampFn").of(new
    DoFn<String,
String>( ) {
    @Override
    public void processElement(ProcessContext c) {
        String[ ] words = c.element( ).split("[^a-zA-Z']+");
        for (String word : words) {
            if (!word.isEmpty( )) {
                c.outputWithTimestamp(word,
                System.currentTimeMillis( ));
            }
        }
    }}))
.apply(Window.into(FixedWindows.<String>of(5,
TimeUnit.MILLISECONDS)))
.apply(ParDo.named("Count Init")
    .of(new DoFn<String, KV<String, Long>>( ) {
        @Override
        public void processElement(ProcessContext c) {
            c.output(KV.of(c.element( ), 1L));
        }}))
.apply(GroupByKey.<String, Long>create( ))
.apply(ParDo.named("Count Combine")
    .of(new DoFn<KV<String, Iterable<Long>>, KV<String,
    Long>>( ) {
        @Override
        public void processElement(ProcessContext c) {
            KV.of(c.element( ).getKey( ),
getIteratorSize(c.element( ).getValue( ).iterator( )));
        }}))
.apply(ParDo.named("FormatCounts")
    .of(new DoFn<KV<String, Long>, String>( ) {
        @Override
        public void processElement(ProcessContext c) {
            String output = "Key: " + c.element( ).getKey( )
                + " Value: " + c.element( ).getValue( )
                + " Timestamp: " + c.timestamp( ) + " (" +
                c.windows( ) + ")";
            c.output(output);
        }}))
.apply(TextIO.Write.named("WriteCounts").to(options.getOutput( ))
```

The ability to build unaligned, event-time windows is an improvement, but two more shortcomings need be addressed. First. the system 100 needs to provide support for tuple- and processing-time-based windows, otherwise windowing semantics will regress relative to other systems in existence. Second, the system 100 must know when to emit the results 20 for a window. Since the data 10 including multiple data points are unordered with respect to event time, the system 100 requires some other signal to notify when the window ends.

The problem of tuple- and processing-time-based windows is address below, after the system 100 builds up a solution to the window completeness problem. As to window completeness, an initial inclination for solving it might be to use some sort of global event-time progress metric, such as watermarks. However, watermarks themselves have two major shortcomings with respect to correctness.

The first shortcoming of watermarks is they are sometimes too fast, meaning there may be late data 10 that arrives behind the watermark. For many distributed data sources, it is intractable to derive a completely perfect event time watermark, and thus impossible to rely on it solely if 100% correctness is desired in the results 20 of the output data.

The second shortcoming of watermarks is they are sometimes too slow. Because they are a global progress metric, the watermark can be held back for the entire pipeline by a single slow datum. And even for healthy pipelines with little variability in event-time skew, the baseline level of skew may still be multiple minutes or more, depending upon the input source. As a result, using watermarks as the sole signal for emitting window results 20 is likely to yield higher latency of overall results than, for example, a comparable Lambda Architecture pipeline.

For these reasons, the system 100 postulates that watermarks alone are insufficient. A useful insight in addressing the completeness problem is that the Lambda Architecture effectively sidesteps the issue: it does not solve the completeness problem by somehow providing correct answers faster; it simply provides the best low-latency estimate of a result that the streaming pipeline can provide, with the promise of eventual consistency and correctness once the batch pipeline runs. Output from the batch job is only correct if input data 10 is complete by the time the batch job runs; if data 10 evolves over time, this must be detected and the batch jobs re-executed. From within a single pipeline (regardless of execution engine), then the system 100 will need a feature to provide multiple answers (or panes) for any given window. This feature includes triggers or trigger times that allow the specification of when to trigger the output results 20 for a given window.

Triggers are a mechanism for stimulating the production of GroupByKeyAndWindow results 20 in response to internal or external signals. They are complementary to the windowing model, in that they each affect system behavior along a different axis of time. Windowing determines where in event time data 10 are grouped together for processing. Triggering determines when in processing time the results 20 of groupings are emitted as panes. Specific triggers, such as watermark triggers, make use of event time in the functionality they provide, but their effects within the pipeline are still realized in the processing time axis.

In some implementations, the system 100 provides predefined trigger implementations for triggering at completion estimates (e.g. watermarks, including percentile watermarks, which provide useful semantics for dealing with stragglers in both batch and streaming execution engines when processing a minimum percentage of the input data 10 quickly is more desirable than processing every last piece of it), at points in processing time, and in response to data 10 arriving (counts, bytes, data punctuations, pattern matching, etc.). In some examples, the system 100 supports composing triggers into logical combinations (and, or, etc.), loops, sequences, and other such constructions. In addition, users may define their own triggers utilizing both the underlying primitives of the execution runtime (e.g. watermark timers, processing-time timers, data arrival, composition support) and any other relevant external signals (data injection requests, external progress metrics, RPC completion callbacks, etc.).

In addition to controlling when the system 100 emits results 20, the triggers API 400 provides a way to control how multiple panes for the same window relate to each other, via three different refinement modes:

The first refinement mode is discarding: Upon triggering, window contents are discarded, and later results 20 bear no relation to previous results 20. This mode is useful in cases where the downstream consumer of the data (either internal or external to the pipeline) expects the values from various trigger fires to be independent (e.g. when injecting into a system that generates a sum of the values injected). It is also the most efficient in terms of amount of data 20 buffered, though for associative and commutative operations which can be modeled as a Dataflow Combiner, the efficiency delta will often be minimal. For the video sessions use case, this is not sufficient, since it is impractical to require downstream consumers of the data 10 to stitch together partial sessions.

The second refinement mode is accumulating: Upon triggering, window contents are left intact in persistent state, and later results 20 become a refinement of previous results 20. This is useful when the downstream consumer expects to overwrite old values with new ones when receiving multiple results 20 for the same window, and is effectively the mode used in Lambda Architecture systems, where the streaming pipeline produces low-latency results, which are then overwritten in the future by the results 20 from the batch pipeline. For video sessions, this might be sufficient if the system 100 is simply calculating sessions and then immediately writing them to some output source that supports updates (e.g. a database or key/value store).

The third refinement mode is accumulating & retracting: Upon triggering, in addition to the Accumulating semantics, a copy of the emitted value is also stored in persistent state. When the window triggers again in the future, a retraction for the previous value will be emitted first, followed by the new value as a normal datum. A simple implementation of retraction processing requires deterministic operations, but non-determinism may be supported with additional complexity and cost; we have seen use cases that require this, such as probabilistic modeling. Retractions are necessary in pipelines with multiple serial GroupByKeyAnd-Window operations, since the multiple results generated by a single window over subsequent trigger fires may end up on separate keys when grouped downstream. In that case, the second grouping operation will generate incorrect results 20 for those keys unless it is informed via a retraction that the effects of the original output should be reversed. Dataflow Combiner operations that are also reversible can support retractions efficiently via an uncombine method. For video sessions, this mode is the ideal. If the system 100 is performing aggregations downstream from session creation that depend on properties of the sessions themselves, for example, by detecting unpopular ads (such as those which are viewed for less than five seconds in a majority of sessions), initial results 20 may be invalidated as inputs that evolve over time, e.g. as a significant number of offline mobile viewers come back online and upload session data. Retractions provide a way for us to adapt to these types of changes in complex pipelines with multiple serial grouping stages. Some specific implementations of the Trigger system are discussed below.

The triggers API 400 provides a structured, composable a way of expressing when (in processing time) the results 20 of an aggregation should be emitted within Dataflow/Streaming Flume. The triggers API 400 works in conjunction with the aggregation API 200 and the windowing API 300, which respectively allow the expression of what the results 20 of an aggregation are, and where (in event time) the aggregations are performed. The triggers API 400 aims to address a number of shortcomings in the existing Streaming Flume/Dataflow APIs relative to standard MillWheel. Some of these shortcomings include:

Late Data—Streaming Flume users are not able to manage late data (i.e. data that arrives behind the watermark). Current systems just drop the late data, which is impractical, even in the short-term.

Speculative Data—Some MillWheel customers perform speculative or partial aggregations manually using percentile watermarks or other data-based heuristics, Streaming Flume has zero support for this currently.

Walltime Aggregations—Many MillWheel pipelines do not care about watermarks, but still want to provide some sort of periodic windowed aggregation. Walltime timers provide a way to provide regular updates containing whatever data has been received thus far, despite how fast or slow the rest of the pipeline may be operating currently.

Data-Driven Aggregations—Another class of aggregations that does not require watermarks is those driven by the data themselves, e.g. hash joins or byte-limited aggregations. Many of these patterns are supported using the existing Streaming Flume APIs (via custom WindowFns and/or the State API), but it may be desirable to incorporate them with a generalized aggregation trigger API, since this would open the possibility of composing data-driven triggers with other triggers (e.g. a hash join that times out after a walltime delay; currently you can only use a streamtime delay).

Watermarks: MillWheel provides watermarks (or cursors) as way of reasoning about completeness of data in a streaming pipeline. By default, watermarks estimate the point in time up to which all data for a given stream has been received or processed. This allows time-boundary aggregations to be performed only once the system 100 believes it has seen all the relevant data.

However, watermarks are established at the point of data injection (i.e., when the data is received), and propagated from there. For many data sources, it's impossible to provide a watermark that is completely accurate. For example, consider log files, a log injector can create a watermark based off of the set of log files the log injector is scanning at any given moment, but if a log saver is delayed for an extended period of time, it is possible for new log files to arrive after the injector has advanced its watermark. The data in these late log files are now late. Downstream computations are then left with the burden of deciding how to handle the late data. In some cases, it can be incorporated into existing results. In others, it may be best to just drop the late data. MillWheel provides no structured framework for dealing with late data, just the minimal infrastructure to detect it. Streaming Flume currently provides no method of interacting with late data; Streaming Flume simply drops it.

Percentile Watermark: MillWheel also supports the notion of percentile watermarks, which give you a watermark estimating the time up to which some specific subset of the data (e.g. 95%) the system 100 has processed. The system 100 may use percentile watermarks instead of the normal watermark to provide speculative results.

This can be used to provide results faster, with some decreased amount of confidence. However, a given computation can currently only make use of only one type of cursor (100% or a single, cell-specific percentile). So providing a complex, tiered set of speculative results is laborious from a configuration perspective, and currently impossible beyond two tiers.

Walltime Aggregation: While watermarks are the most common way of triggering aggregations in MillWheel, there are cases where other types of triggers are more practical. In cases where timeliness of data is more important that any specific notion of completeness, walltime timers may be used to provide periodic updates of the data aggregated thus far. This ensures that a programmer gets timely updates, even in the face of watermark lags due to a small portion of the data being noticeably behind the rest.

Data-Driven Aggregation: Moreover, there exists a whole class of non-time-based aggregations. Examples are hash-joins, aggregations bounded by a number of records or bytes, or aggregations triggered on some feature of the data themselves (e.g. a specific field of a datum having a certain value).

Composite Aggregation: In some examples, it is fairly common to want to compose multiple types of aggregation. Often times, a hash join will have a timeout. in such example, the current system 100, Streaming Flume with streamtime timeouts, may be used, but not walltime. In some examples, the programmer wants to receive a single initial aggregation when the watermark reaches 100%, then periodic (based on walltime) updates when late data arrive. Speculative data is essentially another type of composite aggregation (one each for the desired percentile watermark values).

In some examples, the problem of composing aggregations, be it for late data 10, speculative data, or some other custom composition, then begs the question: how do you provide refinements to the results of an aggregation as your notion of a dataset changes over time?

Several options may be considered for handling updates to aggregations in a streaming pipeline. Option 1: Provide multiple versions of aggregations and ways to manage them. When providing multiple versions, there are two modes the system 100 may support. In a first mode, the subsequent aggregations incorporate all the data 10 seen thus far. In this case, new aggregates 20 would simply replace old aggregates 20. In a second mode, subsequent aggregations 20 incorporate only new data 10 since the last aggregate 20. In this case, new aggregates 20 would have to be manually combined with previous aggregates 20, if desired and/or feasible. The first and second options include cleaning services that have pros and cons. The pros may include, but not limited to: the API sating clean (different versions of the aggregate still have the same type); the user specifies their aggregation logic once, and the system takes care of applying it multiple times as needed; since the system already provides for multiple versions of aggregations (differentiated by timestamp) with windowing in Streaming Flume, so extending versions to a new dimension is relatively natural: (1A) updated aggregates 20 are immediately usable with no extra work from the user; and (1B) no need to keep aggregation state around for some late data horizon. Cons include (1A) the aggregation state must be kept around until late data is no longer allowed. For log sources, this would be two days until goldenization to be 100% correct. State size depends on the type of aggregation performed: Combiner: When performing an aggregation with combineValues, only the intermediate data aggregate (e.g. sum+count for an mean calculation) need be stored.

This yields an overall data storage size of:
O(PARTIAL_AGGREGATE_SIZE*NUM_WINDOWS_IN_HORIZON).

Full-data: Non-combiner aggregations require storing the entire input data set up until the time horizon. This yields an overall data storage size of:
O(INPUT_SIZE_OVER_HORIZON).

(1A) Previous aggregates 20 must be uncombined from any further downstream cumulative aggregations 20. This results in redundant work, and also introduces racy semantics when the new aggregate shuffles to a different key than the old aggregate. (1B) The user must do extra work to combine new aggregates with old aggregates.

Another option, option 2, provides an initial aggregation and access the initial aggregation to raw subsequent data 10 (i.e. "deltas"). This option includes pros such as, but not limited to: the aggregation state doesn't have to be kept around. As for cons, the API is more complicated; aggregate and delta may have different types. Is your output from the operation now a Pair<Aggregate, Delta>? Or do you require the user to fork their code paths? This kills atomicity; user must specify their aggregation logic once for the initial aggregate, then a second time for incorporating delta updates. Many types of aggregations do not support updates via deltas, and thus would not work with this scheme.

Given the lists of pros and cons, options #1A and #1B are solutions that the system 100 may execute for triggering:

Therefore, to address the various use cases described above, the system 100 modifies the window the call Window.into to allow users to also specify the triggers that dictate when aggregates 20 are emitted, as well as the way subsequent aggregates 20 relate to previous aggregates 20:

windowBy(WindowFn, TriggerStrategy);
  Dataflow: Window.into(WindowingStrategy, TriggerStrategy);

The TriggerStrategy object is essentially a tuple of named values:

1. Trigger—Dictates when aggregates 20 would be emitted, e.g. first at 100% watermark percentile, then followed by late data aggregates 20 (when present) every 10 walltime seconds for at most two days.
2. Accumulation mode—Dictates whether later aggregates 20 include data 10 from the previous aggregates 20 or not (i.e. whether the contents of a window are cleared when the window is triggered).
3. Incremental mode—Dictates whether or not anti-data for previous aggregates would be emitted to allow for incremental updates of downstream aggregates.

APIs, High level: the system 100 provides a high-level way to describe when aggregates 20 should be produced during windowing within a GroupByKey operation, as well as how multiple versions of an aggregate 20 relate to each other and whether incremental updates would be performed, via modified windowBy/Window.into operations:

SF: windowBy(WindowFn, TriggerStrategy)
  Dataflow: Window.into(WindowingStrategy, TriggerStrategy) As noted above, TriggerStrategy is a roughly Tuple<Trigger, AccumlationMode, IncrementalMode>.

A trigger is essentially a DoFn-like class with methods that are called by the system 100 at specific points during windowing. Those methods take various arguments about the window(s) and values in question as input, may manipulate per-window-and-trigger persistent state and times, and may emit trigger signals to indicate when a window's contents should be emitted downstream. More details on the API for implementing Triggers are included below in the implementation section.

As with the Windowing APIs 400, custom Trigger implementations are relatively rare. From an end-user perspective, the more interesting part is really the library of pre-built Triggers that we provide.

The triggers library contains both simple and composite triggers (though the distinction between them is largely semantic). Example simple triggers include:

WatermarkPercentile(float percentile)—Emit an aggregate when the given watermark percentile is reached for the end of the window, with percentile in (0.0, 100.0]. Under the covers, these would be implemented via watermark timers. Note that late windows would by definition not fire this type of Trigger. AtPeriod(DateTime reference, long period, TimeUnit units, TimeDomain domain)

Emit an aggregate for the window at the end of the next time window that aligns with the given reference time (reference may be any valid DateTime) using the given period. When run repeatedly, allows periodic aggregates to be emitted, e.g. every period seconds. TimeDomain can be STREAM_TIME or WALL_TIME.

Under the covers, these would be implemented via watermark or walltime timers. AfterDelay(long delay, TimeUnit units, TimeDomain domain)—Emit an aggregate some amount of time after the first datum in the window is seen, e.g. after delay seconds. TimeDomain can be STREAM_TIME or WALL_TIME. Under the covers, these would be implemented via watermark or walltime timers.

AfterBytes(long count)—Emit an aggregate after count number of bytes have been seen.

AfterCount(long recordCount)—Emit an aggregate after count number of records have been seen Custom Trigger—Call a user-provided implementation of the Trigger interface for every record.

```
/**
*Called to decide if an aggregate should be emitted
  after
*this datum is incorporated into the aggregate.
*@param elem The datum.
*@param state Trigger-specific state.
*@return Pair indicating whether an aggregate should
  be emitted,
*and what the new state for the trigger is.
*/
interface UserTrigger<DATA, STATE>extends Trigger
{
Pair<boolean, STATE>shouldEmit(DATA elem,
  STATE state);
}
```

The AfterBytes and AfterCount triggers above could be implemented using this API. So could Z3's Speculative Differs. This provides essentially the same semantics as a custom WindowFn.merge call that calls WindowSet.emit to emit windows early.

Example composite triggers include:

FirstOf(Trigger . . . triggers)—At most one of the provided triggers will be allowed to fire.

SequenceOf(Trigger . . . triggers)—The specified triggers will be allowed to fire in order.

Repeat(Trigger trigger)—After firing, the specified trigger will reset and be allowed to fire again, forever.

RepeatUntil(Trigger trigger, Trigger until)—Same as repeat, except the repetition ends when the until Trigger fires.

RepeatCount(Trigger trigger, int count)—Same as Repeat, except until the trigger has fired count times.

Given these primitives, you can express a number of useful aggregation patterns. For example:

Emit 90% and 100% watermark percentile aggregates, followed by late data aggregates every walltime hour on the hour (when they exist) until two days of data have been processed:

```
new SequenceOf(
new WatermarkPercentile(0.9),
new WatermarkPercentile(1.0),
new RepeatUntil(
new AtPeriod(DateTime.now( ).toDateMidnight( ),
  1, TimeUnit.HOURS, TimeDomain.WALL_TIME),
  new AfterDelay(2, TimeUnit.DAYS, TimeDomain.STREAM_TIME));
```

Perform repeated hash joins, each with one-hour walltime timeout. This would probably be used with the GlobalWindowFn/GlobalWindow, but would not have to be:

```
new Repeat(
new FirstOf(
new HashJoinTrigger( ), //Implements hash join logic
  as a Trigger.
new AfterDelay(1, TimeUnit.HOURS, TimeDomain.WALL_TIME)));
```

Emit a global aggregation (e.g. a global count of records seen over all time) daily at 8 am. This use case is one of the motivations for the Streaming Flume timer API. Given windowing triggers, the timer API can deprecate (and we don't currently expose it for Dataflow).

```
new Repeat(
    new AtPeriod(new DateTime(2000, 1, 1, 8, 0),
        1, TimeUnit.DAYS, TimeDomain.WALL_TIME));
```

The AccumulationMode enum may have four possible values:

CLEAR_ALWAYS—Never accumulate values across trigger calls, ignoring explicit accumulate requests from trigger implementations.

CLEAR_BY_DEFAULT—Clear unless accumulation is explicitly requested by a trigger implementation.

ACCUMULATE_BY_DEFAULT—Accumulate unless clearing is explicitly requested by a trigger implementation.

ACCUMULATE_ALWAYS—Always accumulate values across trigger calls, ignoring explicit clear requests from trigger implementations.

IncrementalMode supports values ENABLED or DISABLED. If enabled, the system would support reversing the effects of previous aggregate values in downstream aggregations via anti-data (e.g. data that are flagged as being used to reverse effects from previously emitted aggregates). This feature is complex enough it warrants its own design doc, and not be included in any of the initial Dataflow or Flume implementations.

The combination of AccumulationMode.ALWAYS and IncrementalMode=true would effectively be Option 1A above. While the combination of AccumulationMode.NEVER and IncrementalMode=false would effectively be Option 1B above (the default mode for the system).

When eventually grouped by key, the results of the GroupByKey may include multiple versions of any given aggregate. These versions would be distinguishable by their production time values, as well as the associated trigger that generated them (as described further in the Low-level API section below).

The one-parameter version of windowBy would be deprecated in an attempt to force the user to explicitly think about when it's appropriate for their aggregations to be emitted. While it remained, it would be implemented in such a way as to provide the original semantics of emitting only at the 100% watermark, with all subsequent late data dropped, e.g.:

```
windowBy(WindowFn, new TriggerStrategy(
    new SequenceOf(new WatermarkPercentile(100)),
    AccumulationMode.NEVER,
    IncrementalMode.DISABLED));
```

Processing Context API: The standard ExecutionContext/ProcessingContext classes may gain some new methods to provide low-level, per-value metrics to reason about multiple versions of aggregates.

Integer ExecutionContext.getWatermarkPercentile( )—Provides the watermark percentile for any value in the system. This will be an integer in [0, 100], or null if the value was produced behind the 100% output watermark (i.e. the value is late). By definition, the watermark percentile will be the fraction of tablets/ranges with watermark values >=the event time of the given value at production time. For internal MillWheel, this would be done via a set of pre-defined percentile watermarks. For Cloud MillWheel, if we provide watermark histograms, we could derive this from the histogram.

long ExecutionContext.getProductionTime( )—Returns the production time for the value. Can be used to distinguish multiple versions of an aggregate chronologically.

Trigger ExecutionContext.getTrigger( )—Provides the Trigger (if any) that generated this value. For non-aggregate values, returns null. Inspecting this value would allow you to determine, for example, if a datum was late or not.

boolean ExecutionContext.isAntiDatum( )—True if the datum is an anti-aggregate (or something derived from an anti-aggregate). Used for uncombining previous aggregates in a pipeline with multiple aggregation stages running with AccumulationMode.Cumulative.

When eventually grouped by key, this would yield at least two version of every window: one for the 95th-percentile of data, and one for the 100th-percentile of data. If any late data arrived, you would also get an updated version of the aggregation for each late datum.

Implementation of the Flume triggers API: Simple triggers are implemented via subclasses of the Trigger<B extends Window, T>class. The class consists of three abstract methods that are called into by the windowing API 400 each of which receives a specialized context class that provides all the operations available in the given context.

onDatum—Called immediately after a datum is first incorporated into a window. Provided with both the window and the (unincorporated) value. The full aggregate value of the window may be accessed via Window.peekValue( ) which may be expensive if not using an AggrFn. May read/write per-tag state for the window.

May inspect the current time in all time domains. May set/delete per-tag timers for the window. May trigger and clear the window value. May mark the Trigger done.

```
void onDatum(OnDatumContext ctx);
class OnDatumContext {
    B window( );
    T datum( );
    <V> V lookupState(String tag, Coder<V> coder);
    <V> void storeState(String tag, V value, Coder<V> coder);
    Instant now(TimeDomain domain);
    Timer getTimer(String tag);
    void setTimer(String tag, Instant time, TimeDomain domain);
    void deleteTimer(String tag);
    void trigger( ); // shorthand for trigger(Mode.DEFAULT);
    void trigger(Mode mode);
    void done( );
}
enum Mode {
    ACCUMULATE,
    DEFAULT,
    CLEAR;
}
``` onMerge—Called immediately after window merging has occurred. Provided with the source windows and the merged window. May read per-tag state for source windows, and write per-tag state for the merged window. May inspect the current time in all time domains. May inspect per-tag timers for source windows and set per-tag timers for the merged window. May trigger and clear the window value. May mark the Trigger done. All state and unfired timers for source windowswill be deleted (via calls to reset) upon callback completion.

```
void onMerge(OnMergeContext ctx);
class OnMergeContext {
    Iterable<B> sourceWindows( );
    B mergedWindow( );
```

```
        <V> V lookupSourceState(
            B window, String tag, Coder<V> coder);
        <V> void storeState(
            String tag, V value, Coder<V> coder);
        Instant now(TimeDomain domain);
        void getSourceTimer(B window, String tag);
        void setTimer(
            String tag, Instant time, TimeDomain domain);
        void trigger( ); // shorthand for trigger(Mode.DEFAULT);
        void trigger(Mode mode);
        void clear( );
        void done( );
    }
``` onTimer—Called when a timer set by the trigger fires. Provided with the window and the timer tag, instant, and domain. May read/write per-tag state and for the window. May inspect the current time in all time domains. May set/delete per-tag timers for the window. May trigger and clear the window value. May mark the trigger done.

```
void onTimer(OnTimerContext ctx);
    class OnTimerContext {
        B window( );
        String tag( );
        Instant time( );
        TimeDomain domain( );
        <V> V lookupState(String tag, Coder<V> coder);
        <V> void storeState(String tag, V value, Coder<V> coder);
        Instant now(TimeDomain domain);
        void getTimer(String tag);
        void setTimer(String tag, Instant time, TimeDomain domain);
        void deleteTimer(String tag);
        void trigger( ); // shorthand for trigger(Mode.DEFAULT);
        void trigger(Mode mode);
        void clear( );
        void done( );
    }
}
```

Note that, for the sake of allowing helper methods to be written and used from multiple different callbacks when performing compatible operations, common context methods (such as lookupState) is defined in its own interface, e.g.:

```
interface LookupStateContext {
    <V> V lookupState(String tag, Coder<V> coder);
}
```

Note the promotion of timers to a first-class object. This requires that the system 100 track all timers in persistent state under the covers, but relieves the user of the burden of doing so (which is a common use of persistent state when dealing with timers), and allows the system 100 to clean up all timers for a trigger automatically during garbage collection.

```
interface Timer {
    String tag( );
    Instant time( );
    TimeDomain domain( );
}
```

Integration into the existing windowing system is relatively straightforward, with the two main invocation points being after a datum is first incorporated into a window (for onDatum) and after windowshave been merged by the WindowingStrategy's merge function (for onMerge).

More interesting is how to support the creation of composite triggers, e.g. FirstOf, SequenceOf, etc. Composite triggers would be implemented using the CompositeTrigger class, which provides a superset of the functionality of Trigger (and indeed is an actual superclass of it). Each context in CompositeTrigger would support one or two additional operations:

invokeChild—Invokes the current callback on the given child trigger. Available in all operations (onDatum, onMerge, onTimer, reset). Under the covers, keeps track of the lineage up to the current child, using that lineage to provide unique namespaces for all state and timers manipulated by any given child. Also allows void invokeChild(Trigger trigger);

triggerHistory—Return the sequence of child triggers within which the ctx.trigger( )method has been invoked during the lifetime of this callback as a list of TriggerEvent objects (which capture the invoking trigger and whether a clear was requested). Available in all operations whose context class includes a trigger method (onDatum, onMerge, onTimer). Note that the triggers returned by triggerHistory are strictly among the direct descendents of this specific trigger (e.g. grandchild triggers will never directly show up in the results of this function call, though they may result in a child trigger showing up).

```
interface TriggerEvent {
    Trigger trigger( );
    bool andClear( );
}
class TriggerHistory implements Iterable<TriggerEvent> {
    long size( );
    bool allClear( );
}
    TriggerHistory triggerHistory( );
```

In addition, CompositeTrigger provides a fourth callback that allows a parent to hook into a child's timer callback, since timers are scoped to a specific trigger, but may have implications for a parent:

onChildTimer—Called when a timer set by a child trigger fires. Provided with the window, the child trigger, and the timer tag, instant, and domain. May read/write its own per-tag state and for the window. May inspect the current time in all time domains. May inspect/set/delete its own per-tag timers for the window. May trigger and clear the window value. May mark the trigger done. May invoke the child timer. May inspect any trigger calls made by the child.

```
void onChildTimer(OnTimerContext ctx);
    class OnTimerContext {
        B window ( );
        String tag( );
        Trigger child( );
        Instant time( );
        TimeDomain domain( );
        <V> V lookupState(String tag, Coder<V> coder);
        <V> void storeState(String tag, V value, Coder<V> coder);
        Instant now(TimeDomain domain);
        Timer getTimer(String tag);
        void setTimer(String tag, Instant time, TimeDomain domain);
        void deleteTimer(String tag);
        void trigger( ); // shorthand for trigger(Mode.DEFAULT);
        void trigger(Mode mode);
```

```
        void done( );
        void invokeChild( );
        TriggerHistory triggerHistory( );
}
```

By using these APIs, it is possible for the system 100 to provide the complete expressiveness of the MillWheel API, while typically not requiring end users to deal with the complexities of the underlying low-level API. For a suite of example Trigger implementations, see below.

On-disk state: Triggers store the following on-disk state.

User tag/value pairs.

User timers (in the timer system)

User tag/Timer pairs (in persistent state)

A snapshot of the last emitted value for the window if Incremental Mode is enabled.

A tombstone for Triggers that are marked done.

Accumulation Mode:

The system 100 may follow the directions of the accumulation mode setting for the current TriggerStrategy when deciding whether to automatically clear the window value on trigger calls and whether to obey clear calls from the Trigger implementations.

Incremental Mode: Anti-data consisting of the previous value for a window would be generated any time a window is triggered.

When windows are merged in incremental mode, their last-emitted values (if any) are merged as well. Downstream, all non-GroupByKey operations on an anti-datum produce more anti-data (similar to timestamp propagation). When a GroupByKey operation is reached, anti-data are fed into the uncombine method. The result of an uncombine is then normal data, not anti-data; however, if the TriggerStrategy for that GBK enables Incremental Mode, then an anti-datum for the previous value of that window will also be emitted. The system 100 is not targeting Incremental Mode support initially for any of the Dataflow/Flume products; the feature probably merits a design doc all of its own.

MillWheel: MillWheel may support extra metadata via annotations (e.g., similar to as for windows):

Trigger metadata will be added when a trigger fires.

Watermark percentiles will be annotated on raw data at injectors, and on aggregate data at trigger time.

Anti-data are tagged as such when emitted.

Providing fine-grained estimates of watermark percentiles will require tracking global watermark histograms instead of single minimum watermark values. Watermark histograms are planned for WindMill. They would need to be added to MillWheel.

Two features in this API would require support for multiple timer managers:

Arbitrary watermark percentile triggers.

TriggerSets containing both watermark and walltime timers.

WindMill is built with support for multiple timer managers, and should be able to support the watermark+walltime feature out of the box. Support for multiple watermark percentiles shouldn't be too much more difficult. MillWheel may need a refactoring of the timer manager code to support either feature.

Appendix A—Example Trigger Implementations

AfterCount

```
class AfterCount<B, T>extends Trigger<B, T>{
    private final long threshold;

public AfterCount(long threshold) {
        this.threshold = threshold;
    }
    @Override
    public void onDatum(OnDatumContext ctx) {
        Long count = ctx.lookupState("count", LONG_CODER);
        if (count == null)
            count = 0;
        storeAndPossiblyEmit(count + 1);
    }
    @Override
    public void onMerge(OnMergeContext ctx) {
        int mergedCount = 0;
        for (B window : ctx.sourceWindows( )) {
            Long count = ctx.lookupSourceState(window, "count",
                LONG_CODER);
            if (count != null)
                mergedCount += count;
        }
        storeAndPossiblyEmit(mergedCount, count);
    }
    @Override
    protected void reset(ResetContext ctx) {
        clearState("count");
    }
    private void storeAndPossiblyEmit(
            StoreStateContext stateCtx, TriggerContext triggerCtx, long
                count) {
        if (count > threshold) {
            triggerCtx.trigger( );
            triggerCtx.done( );
        } else {
            stateCtx.storeState("count", count, LONG_CODER);
        }
    }
}
AfterDelay
class AfterDelay<B, T> extends Trigger<B, T> {
    private final delay;
    private final TimeDomain domain;
    public AfterDelay(long delay, TimeDomain domain) {
        assert delay >= 0;
        this.delay = delay;
        this.domain = domain;
    }
    @Override
    public void onDatum(OnDatumContext ctx) {
        if (getTimer("delay") == null)
            setTimer("delay", ctx.now(domain) + delay, domain);
    }
    @Override
    protected void onMerge(OnMergeContext ctx) {
        long maxTime = -1;
        for (B window : ctx.sourceWindows( )) {
            Timer timer = getSourceTimer(window, "delay");
            if (timer)
                maxTime = Math.max(timer.time( ).toLong( ),
                    maxTime);
        }
        if (maxTime >= 0)
            setTimer("delay", ctx.now(domain) + delay, domain);
    }
    @Override
    public void onTimer(OnTimerContext ctx) {
        ctx.trigger( );
        ctx.done( );
    }
}
AtWatermark
class AtWatermark<B, T> extends Trigger<B, T> {
    public AtWatermark(double percentile) {
        assert percentile == 100.0;
        this.percentile = percentile;
    }
```

```
        @Override
        protected void onDatum(OnDatumContext ctx) {
            B window = ctx. window( );
            if (window.end( ) <= ctx.now(TimeDomain.STREAM)
                    && ctx.getTimer("watermark") == null) {
                ctx.setTimer("watermark", window.end( ),
                    TimeDomain.STREAM);
            }
        }
        @Override
        protected void onTimer(OnTimerContext ctx) {
            ctx.trigger( );
            ctx.done( );
        }
        @Override
        protected void onMerge(OnMergeContext ctx) {
            ctx.setTimer("watermark", ctx.mergedWindow( ).end( ),
                TimeDomain.STREAM);
        }
    }
}
ResultIdOdd
class ResultIsOdd<B, T extends Long> extends Trigger<B, T> {
    public ResultIsOdd( ) { }
    @Override
    public void onDatum(OnDatumContext ctx) {
        handleWindowed(ctx. window( ));
    }
    @Override
    public void onMerge(B window1, B window2, B windowMerged) {
        handleWindow(ctx.mergedWindow( ));
    }
    private handleBucket(B window, TriggerContext ctx) {
        Long result = window.peekValue( );
        if (result % 2 = 1)
            ctx.trigger( );
    }
}
FirstOf
class FirstOf extends CompositeTrigger {
    private final TriggerFn[ ] triggers;
    public FirstOf(TriggerFn... triggers) {
        this.triggers = triggers;
    }
    @Override
    private void onDatum(OnDatumContext ctx) {
        for (Trigger trigger : triggers) {
            trigger.invokeChild(trigger);
        }
        maybeTrigger(ctx);
    }
    @Override
    private void onMerge(B window1, B window2, B windowMerged) {
        for (Trigger trigger : triggers) {
            ctx.invokeChild(trigger);
            if (ctx.triggerHistory( ).size( ) > 0)
                break;
        }
        maybeTrigger(ctx);
    }
    @Override
    public onChildTimer(OnChildTimerContext ctx) {
        invokeChild( );
        maybeTrigger(ctx);
    }
    private void maybeTrigger(CompositeTriggerContext ctx) {
        TriggerHistory history = ctx.triggerHistory( );
        if (history.size( ) > 0) {
            ctx.trigger(history.iterator( ).next( ).andClear( ));
            ctx.done( );
        }
    }
}
SequenceOf
class SequenceOf<B, D> extends CompositeTrigger<B, D> {
    private final TriggerFn[ ] triggers;
    public SequenceOf(TriggerFn... triggers) {
        this.triggers = triggers;
    }
```

```
        @Override
        private void onDatum(OnDatumContext ctx) {
            invokeChild(activeTrigger(window));
            maybeTriggerAndIncrement(ctx, ctx);
        }
        @Override
        public onChildTimer(OnChildTimerContext ctx) {
            assert activeTrigger(ctx).equals(ctx.trigger( ));
            invokeChild( );
            maybeTriggerAndIncrement(ctx, ctx);
        }
        @Override
        private void onMerge(OnMergeContext ctx) {
            int minIndex = triggers.length;
            for (B window: ctx.sourceWindows( )) {
                int index =
                    lookupIndex(ctx.asLookupStateContext(window));
                minIndex = Math.min(minIndex, index);
            }
            assert minIndex != triggers.length;
            // Starting at the min index of all sequences being
            // merged, merge and look for triggers until you get
            // to an index that doesn't trigger or run out of
            // indices. invokeChild for merges is smart enough
            // to not try to merge triggers that are already
            // done (and to not call merge if only one non-done
            // child trigger exists)
            TriggerHistory history = ctx.triggerHistory( );
            int lastTriggerHistorySize = 0;
            int index = minIndex;
            for (; i < triggers.length; ++i) {
                invokeChild(triggers[i]);
                if (history.size( ) == lastTriggerHistorySize)
                    break;
                lastTriggerHistorySize = history.size( );
                ctx.trigger(history.allClear( ));
            }
            storeOrMarkDone(ctx, index);
        }
        private void storeOrMarkDone(StateAndTriggerContext ctx, int
index) {
            if (index == triggers.length( )) {
                ctx.done( );
            } else {
                ctx.storeState("index", index, INT_CODER);
            }
        }
        private void maybeTriggerAndIncrement(StateAndTriggerContext
ctx) {
            TriggerHistory history = ctx.triggerHistory( );
            if (history.size( ) > 0) {
                ctx.trigger(history.allClear( ));
                            storeOrMarkDone(ctx, lookupIndex(ctx) + 1);
            }
        }
        private int lookupIndex(LookupStateContext ctx) {
            Integer index = ctx.lookupState("index", INT_CODER);
            if (index == null)
                index = 0;
            return index;
        }
        private Trigger activeTrigger(LookupStateContext ctx) {
            return triggers[lookupIndex(ctx)];
        }
    }
}
```

FIGS. 6A-6I show example plots 600, 600a-i that highlight a plurality of useful output patterns supported by the system 100. The example plot 600 is illustrated in the context of the integer summation pipeline.

Figure 6B:
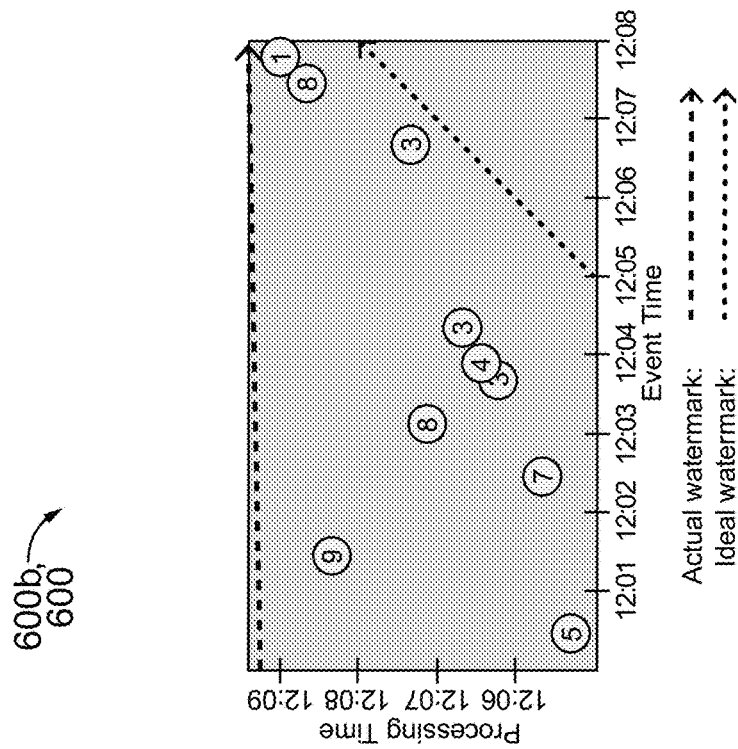
FIG. 6B is an example plot showing an output result within a single global window.
Figure 6A:
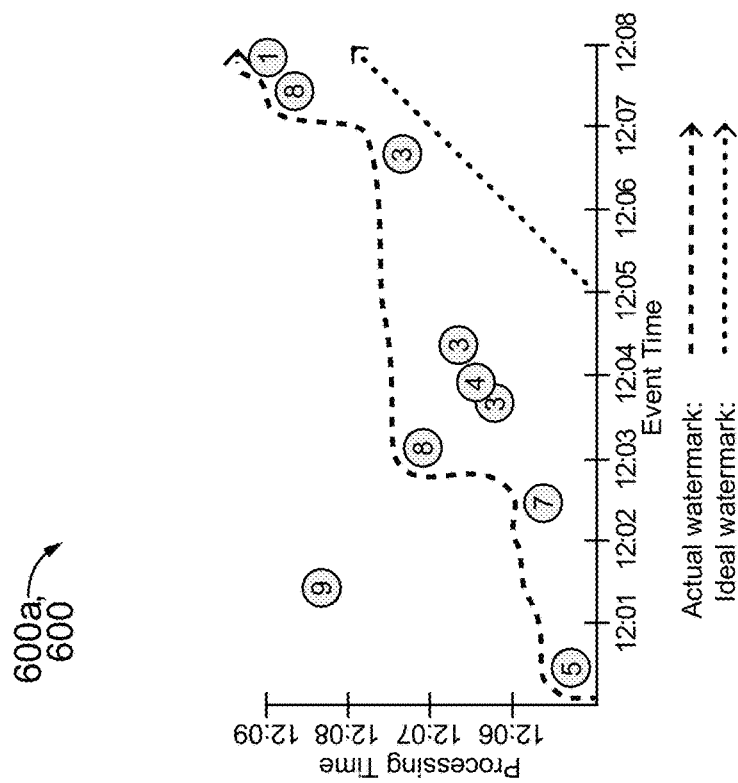
FIG. 6A is an example plot of window time domain skew for data point inputs.

PCollection<KV<String, Integer>>output=input
.apply(Sum.integersPerKey( ));

Using an input source from which the system 100 receives data 10 including ten data points, each data point associated with a small integer value and analyzed by the system 100 in the context of both bounded and unbounded data sources. For diagrammatic simplicity, the system 100 in the example plots 600 assumes the data points of the received data 10 are for the same key; however, in a real pipeline, the operations performed by the system 100 would be happening in parallel for multiple keys. FIG. 6A is an example plot 600 showing a window time domain skew for the data point inputs of the received data 10. The X axis plots the data 10 in event time (i.e. when the events actually occurred), while the Y axis plots the data 10 in processing time (i.e. when the pipeline observes them). All the plots 600, 600a-i assume execution on the streaming engine unless otherwise specified.

Many of the plots 600 will also depend on watermarks when included in the plots 600. In these scenarios, the plots 600 show an ideal watermark and an example actual watermark. The straight dotted line with slope of one rep-resents the ideal watermark, i.e. if there were no event-time skew and all events were processed by the system 100 as they occurred. Given the vagaries of distributed systems, skew is a common occurrence; this is exemplified by the meandering path the actual watermark takes from the ideal watermark, as shown in the plot 600a of FIG. 6A. Note also that the heuristic nature of this watermark is exemplified by the single "late" datum (e.g., data point) with value 9 that appears behind the watermark.

If the system 100 were to process the received data 10 in a classic batch system using the described summation pipeline, the system 100 would wait for all the data 10 to arrive, group the data 10 together into one bundle (since these data points are all for the same key), and sum their values to arrive at a total result of 51. The plot 600b of FIG. 6B shows this result represented by the darkened rectangle, whereat the area covers the ranges of event time and processing time included in the sum (with the top of the rectangle denoting when in processing time the result was materialized). Since classic batch processing is event-time agnostic, the result 20 is contained within a single global window covering all of event time. And since outputs are only calculated once all inputs (e.g., data 10) are received, the result 20 covers all of processing time for the execution.

Note the inclusion of watermarks in plot 600b. Though not typically used for classic batch processing, watermarks would semantically be held at the beginning of time until all data 10 has been processed, then advanced to infinity. An important point to note is that one can get identical semantics to classic batch by running the data through a streaming system with watermarks progressed in this manner.

In some implementations, the system converts the pipeline to run over an unbounded data source. In Dataflow, the default triggering semantics are to emit windows when the watermark passes them. But when using the global window with an unbounded input source, the triggering semantics will not emit windows when the watermark passes since the global window covers all of event time. As such, the system 100 needs to either trigger by something other than the default trigger, or window by something other than the global window. Otherwise, the system 100 will not produce an output result 20.

Figure 6D:
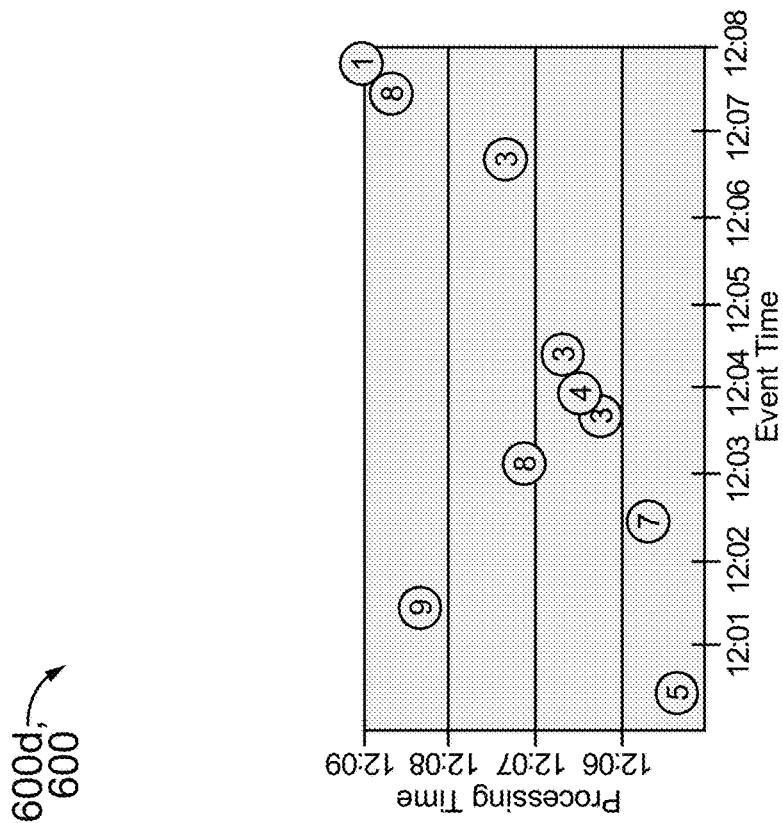
FIG. 6D is an example plot showing output results from independent regions of processing time.
Figure 6C:
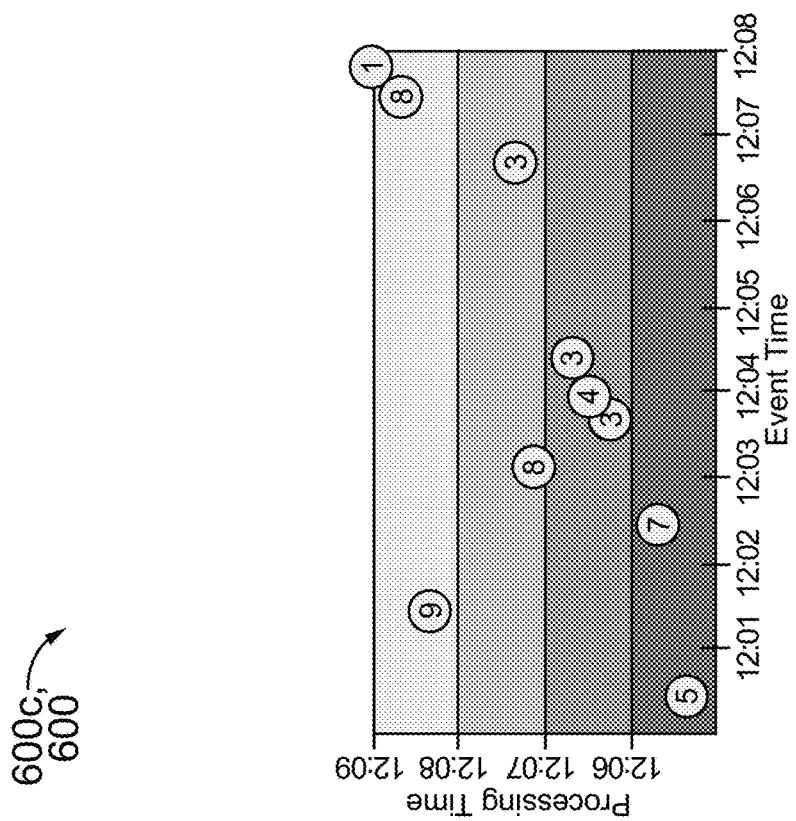
FIG. 6C is an example plot showing output results accumulating over regions of processing time.

In some examples, changing the trigger allows the system 100 to generate conceptually identical outputs (a global per-key sum over all time), but with periodic updates. In these examples, the system 100 applies a Window.trigger operation that repeatedly fires on one-minute periodic processing-time boundaries. The system 100 may specify the Accumulating mode so that the global sum will be refined over time (this assumes the system 100 includes an output sink into which the system 100 may overwrite previous results for the key with new results, e.g. a database or key/value store). Referring to plot 600c of FIG. 6C, the system 100 generates updated global sums once per minute of processing time. Note how the semi-transparent output rectangles (e.g., windows) overlap, since Accumulating panes build upon prior results by incorporating overlapping regions of processing time:

PCollection<KV<String, Integer>>output=input
      .apply(Window.trigger(Repeat(AtPeriod(1, MINUTE)))
      .accumulating( ))
      .apply(Sum.integersPerKey( ));

Conversely, the plot 600d of FIG. 6D shows the system 100 generating the delta in sums once per minute by switching to the Discarding mode. Note that by switching to the Discarding mode, the system 100 effectively gives the processing-time windowing semantics provided by many streaming systems. The output panes no longer overlap, since their results incorporate data from independent regions of processing time.

PCollection<KV<String, Integer>>output=input
      .apply(Window.trigger(Repeat(AtPeriod(1, MINUTE)))
      .discarding( ))
      .apply(Sum.integersPerKey( ));

Another more robust way of providing processing-time windowing semantics is to simply assign arrival time as event times at data ingress, then use event time windowing. A nice side effect of using arrival time event times is that the system has perfect knowledge of the event times in flight, and thus can provide perfect (i.e. non-heuristic) watermarks, with no late data. This is an effective and cost-efficient way of processing unbounded data for use cases where true event times are not necessary or available.

Before incorporating other windowing options, the system 100 may consider one more changes to the triggers for this pipeline. In some examples, the system 100 may model tuple-based windows by simply changing the trigger to fire after a certain number of data arrive, say two. Referring to FIG. 6E, the plot 600e shows five output results from independent regions of processing time. For instance, each output results contains the sum of two adjacent (by processing time) data point inputs. More sophisticated tuple-based windowing schemes (e.g. sliding tuple-based windows) require custom windowing strategies, but are otherwise supported.

PCollection<KV<String, Integer>>output=input
      .apply(Window.trigger(Repeat(AtCount(2)))
        .discarding( ))
      .apply(Sum.integersPerKey( ));

Other examples for supporting un-bounded sources include switching away from global windowing. Here, the system 100 may window (e.g., via the Windowing API 300) the data 10 into fixed, two-minute Accumulating windows:

PCollection<KV<String, Integer>>output=input
      .apply(Window.into(FixedWindows.of(2, MINUTES)
        .accumulating( )
      .apply(Sum.integersPerKey( );

With no trigger strategy specified, the system 100 would use the default trigger, which is effectively:

PCollection<KV<String, Integer>>output=input
      .apply(Window.into(FixedWindows.of(2, MINUTES))
        .trigger(Repeat(AtWatermark( )))
        .accumulating( ))
      .apply(Sum.integersPerKey( ));

The watermark trigger fires when the watermark passes the end of the window in question. Both batch and streaming engines implement watermarks, as detailed below. The Repeat call in the trigger is used to handle late data; should any data arrive after the watermark, they will instantiate the repeated watermark trigger, which will fire immediately since the watermark has already passed.

Figure 6F:
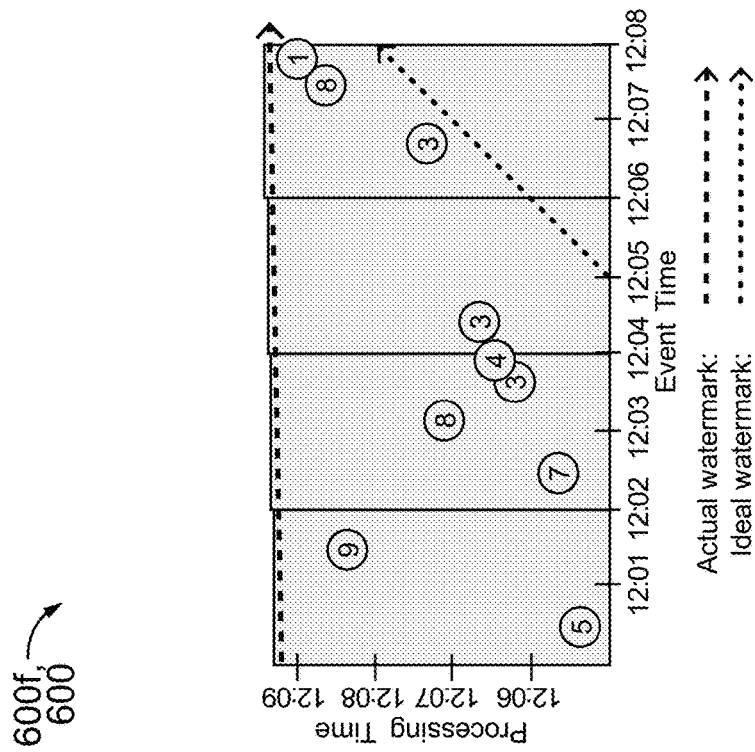
FIG. 6F is an example plot showing data point inputs grouped within fixed windows and output results emitted from the fixed windows as a watermark advances.
Figure 6E:
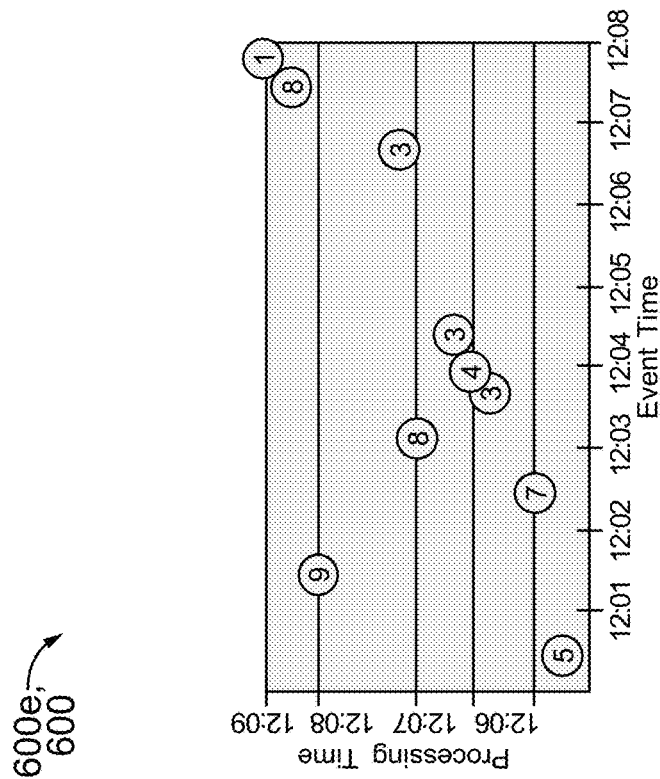
FIG. 6E is an example plot showing output results from independent regions of processing time.
Figure 6H:
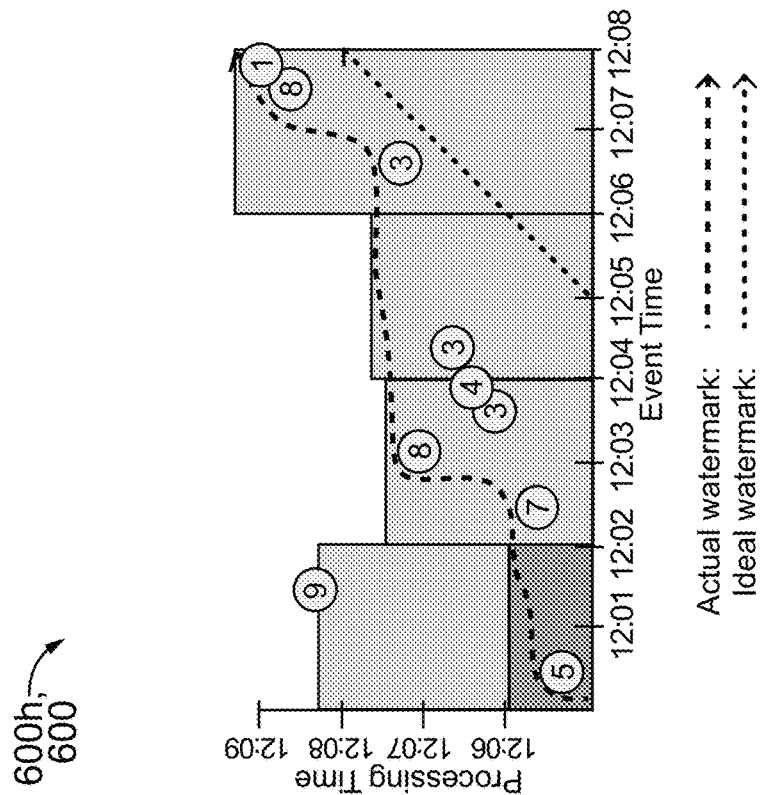
FIG. 6H is an example plot showing a late data point updating an output result of a fixed window.
Figure 6G:
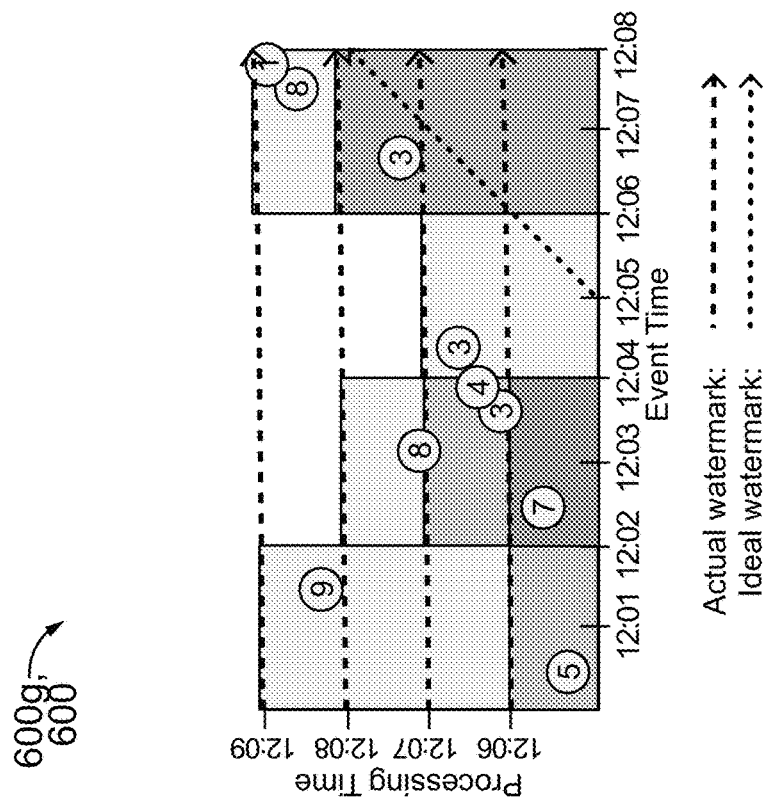
FIG. 6G is an example plot showing data point inputs grouped within fixed windows and output results emitted from the fixed windows in successive micro-batches.

Referring to FIGS. 6F-6H, the plots 600f-600h each characterize this pipeline on a different type of runtime engine. In some implementations, the system 100 first observes what execution of this pipeline would look like on a batch engine. In these implementations, the data source would have to be a bounded one, so as with the classic batch example above, the system 100 would wait for all data 10 in the batch to arrive. Thereafter, the system 100 would then process the data in event-time order by emitting windows as the simulated watermark advances, as in the example plot 600f of FIG. 6F.

When executing a micro-batch engine over this data source with one minute micro-batches, the system 100 would gather input data 10 for one minute, process the data 10, and repeat. Each time, the watermark for the current batch would start at the beginning of time and advance to the end of time (technically jumping from the end time of the batch to the end of time instantaneously, since no data would exist for that period). The system 100 ends up with a new watermark for every micro-batch round, and corresponding outputs for all windows whose contents had changed since the last round. This provides a very nice mix of latency and eventual correctness, as in the example plot 600g of FIG. 6G.

When executing the pipeline in a streaming engine, the plot 600h of FIG. 6H shows a late data point updating an output result of a fixed window. While most windows emit their associated data points when the water mark passes, the system 100 receives datum (e.g., data point) with value 9 late relative to the watermark. For whatever reason (mobile input source being offline, network partition, etc.), the system 100 did not realize that the datum with value 9 had not yet been injected, and thus, having observed the datum with value 5 associated with the same window (for event-time range [12:00, 12:02]), allowed the watermark to proceed past the point in event time that would eventually be occupied by the datum with value 9. Hence, once the datum with value 9 finally arrives, it causes the first window (for event-time range [12:00, 12:02]) to retrigger with an updated sum.

This output pattern is nice in that we have roughly one output per window, with a single refinement in the case of the late datum. But the overall latency of results is noticeably worse than the micro-batch system, on account of having to wait for the watermark to advance; this is the case of watermarks being too slow.

If the system 100 desires lower latency via multiple partial results for all of our windows, the system 100 may add in some additional, processing-time-based triggers to provide regular updates until the watermark actually passes. Referring to FIG. 6I, plot 600i shows output results based on processing-time-based triggers to yield somewhat better latency than the micro-batch pipeline of plot 600h, since the data points of the received data accumulatein windows as they arrive instead of being processed in small batches. Given strongly-consistent micro-batch and streaming engines, the choice between them (as well as the choice of micro-batch size) really becomes just a matter of latency versus cost, which is exactly one of the goals the system 100 may achieve based on the following model.

Figure 6J:
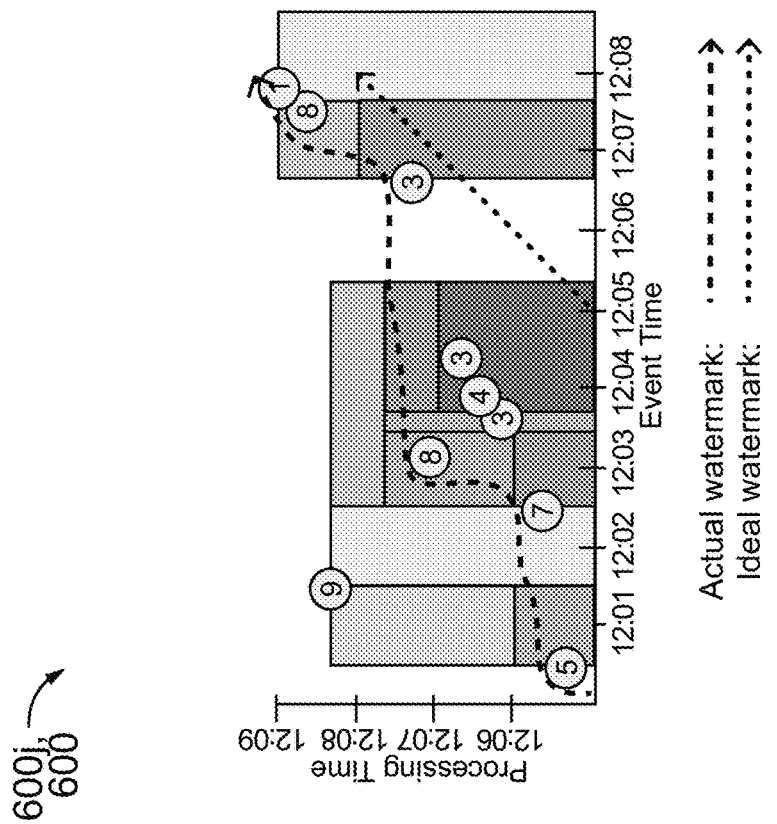
FIG. 6J is an example plot showing data point inputs grouped within session windows and combined output results emitted from combined session windows.
Figure 6I:
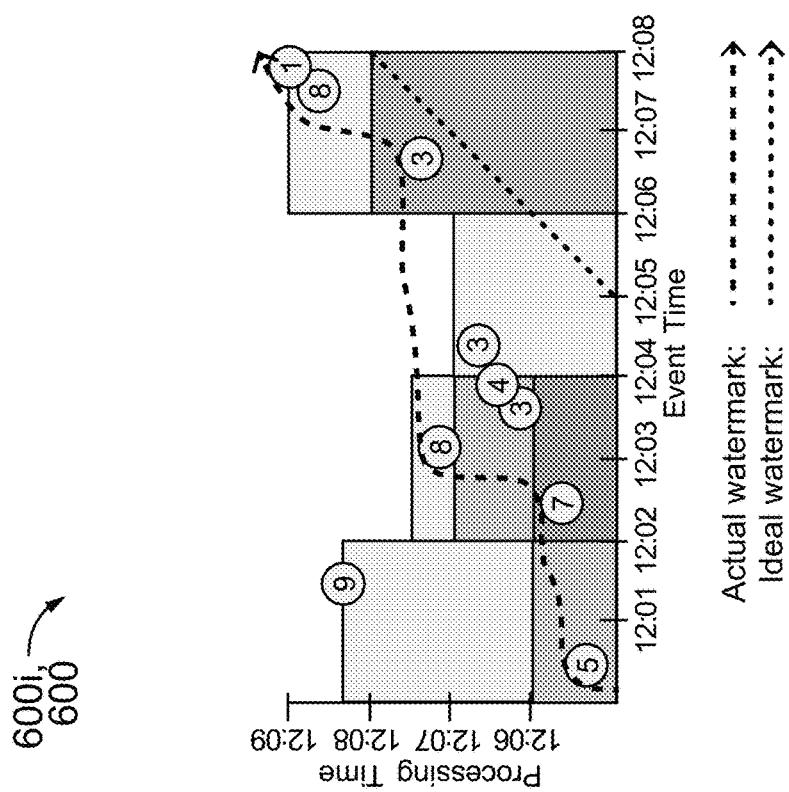
FIG. 6I is an example plot showing output results based on processing-time-based triggers.

PCollection<KV<String, Integer>>output=input
    .apply(Window.into(FixedWindows.of(2, MINUTES))
    .trigger(SequenceOf(
    RepeatUntil(
    AtPeriod(1, MINUTE),
    AtWatermark( )),
    Repeat(AtWatermark( )))
    .accumulating( ))
    .apply(Sum.integersPerKey( ));

Referring to FIG. 6J, the plot 600j shows the data points of the received data 10 grouped within session windows and combined output results emitted from combined window sessions. Here, the system 100 may satisfy the video sessions requirements (modulo the use of summation as the aggregation operation, maintained for diagrammatic consistency; switching to another aggregation would be trivial), by updating to session windowing with a one minute timeout and enabling retractions. This highlights the composability provided by breaking the model into four pieces (what the system 100 is computing, where the system 100 is computing in event time, when in processing time the system 100 emits results of the computing, and how those results relate to later refinements), and also illustrates the power of reverting previous values which otherwise might be left uncorrelated to the value offered as replacement.

PCollection<KV<String, Integer>>output=input
    .apply(Window.into(Sessions.withGapDuration(1,
    MINUTE)).trigger(SequenceOf(RepeatUntil(
    AtPeriod(1, MINUTE),
    AtWatermark( )),
    Repeat(AtWatermark( )))
    .accumulatingAndRetracting( ))
    .apply(Sum.integersPerKey( ));

In the example plot 600j of FIG. 6J, the system 100 outputs initial singleton sessions for values 5 and 7 at the first one-minute processing-time boundary. At the second minute boundary, the system 100 outputs a third session with value 10, built up from the values 3, 4, and 3. When the value of 8 is finally observed, it joins the two sessions with values 7 and 10. As the watermark passes the end of this new combined session, the system 100 emits retractions for the values 7 and 10 sessions, as well as a normal datum for the new session with value 25. Similarly, when the datum with value 9 arrives (late), it joins the session with value 5 to the session with value 25. The repeated watermark trigger then immediately emits retractions for both value 5 and value 25, followed by a combined session of value 39. A similar execution occurs for the data points with values 3, 8, and 1, ultimately ending with a retraction for an initial value 3 session, followed by a combined session value 12.

FlumeJava may implement the system 100, with Mill-Wheel used as the underlying execution engine for streaming mode; additionally, an external reimplementation for Cloud Dataflow is largely complete at the time of writing. Due to prior characterization of those internal systems in the literature, as well as Cloud Dataflow being publicly available, details of the implementations themselves are elided here for the sake of brevity. One interesting note is that the core windowing and triggering code is quite general, and a significant portion of it is shared across batch and streaming implementations; that system itself is worthy of a more detailed analysis in future work.

Important factors for design from real world experience are below. For designing the Dataflow Model, real-world experiences with FlumeJava and Mill-Wheel over the years are considered. Configurations which worked well, may be incorporated, while configurations with less desirable results motivated changes in the Dataflow Model design.

A number of teams run log joining pipelines on Mill-Wheel. One particularly large log join pipeline runs in streaming mode on MillWheel by default, but has a separate Flume-Java batch implementation used for large scale backfills. A much nicer setup would be to have a single implementation written in a unified model that could run in both streaming and batch mode without modification. This became the initial motivating use case for unification across batch, micro-batch, and streaming engines, and was highlighted in plots 600f-600h of FIGS. 6F-6H.

Another motivation for the unified model came from an experience with the Lambda Architecture. Though most data processing use cases are handled exclusively by a batch or streaming system, one MillWheel customer ran their streaming pipeline in weak consistency mode, with a nightly MapReduce to generate truth. They found that customers stopped trusting the weakly consistent results over time, and as a result reimplemented their system around strong consistency so they could provide reliable, low latency results. This experience further motivated the desire to support fluid choice amongst execution engines.

From the outset, the system 100 needed to support sessions; this in fact is the main contribution of the underlying windowing model over existing models. Sessions are an extremely important use case (and were in fact one of the reasons MillWheel was created), and are used across a number of product areas, including search, ads, analytics, social, and YouTube. Any product that correlates bursts of otherwise disjoint user activity over a period of time does so by calculating sessions. Thus, support for sessions became paramount in the design of the Dataflow Model implemented by system 100. As shown in the plot 600j of FIG. 6J, the system 100 generating sessions in the Dataflow Model is trivial.

Two teams with billing pipelines built on MillWheel experienced issues that motivated parts of the model. Recommended practice at the time was to use the watermark as a completion metric, with ad hoc logic to deal with late data or changes in source data. Lacking a principled system for updates and retractions, a team that processed resource utilization statistics ended up leaving our platform to build a custom solution (the model for which ended being quite similar to the one we developed concurrently). Another billing team had significant issues with watermark lags caused by stragglers in their input. These shortcomings became major motivators in our design, and influenced the shift of focus from one of targeting completeness to one of adaptability over time. The results were twofold: triggers, which allow the concise and flexible specification of when results are materialized, as evidenced by the variety of output patterns possible over the same data set in plots 600c-600j FIGS. 6C-6J; and incremental processing support via accumulation (FIGS. 6C and 6D) and retractions (FIG. 6J).

Many MillWheel pipelines calculate aggregate statistics (e.g. latency averages). For them, 100% accuracy is not required, but having a largely complete view of their data in a reasonable amount of time is. Given the high level of accuracy we achieve with watermarks for structured input sources like log files, such customers find watermarks very effective in triggering a single, highly-accurate aggregate per window. Watermark triggers are highlighted in the plot 600h of FIG. 6H. A number of abuse detection pipelines run on MillWheel. Abuse detection is another example of a use case where processing a majority of the data quickly is much more useful than processing 100% of the data more slowly. As such, they are heavy users of MillWheel's percentile watermarks, and were a strong motivating case for being able to support percentile watermark triggers in the model.

Relatedly, a pain point with batch processing jobs is stragglers that create a long tail in execution time. While dynamic rebalancing can help with this issue, FlumeJava has a custom feature that allows for early termination of a job based on overall progress. One of the benefits of the unified model for batch mode is that this sort of early termination criteria is now naturally expressible using the standard triggers mechanism, rather than requiring a custom feature.

Another pipeline considered building trees of user activity (essentially session trees) across multiple systems. These trees were then used to build recommendations tailored to users' interests. The pipeline was noteworthy in that it used processing-time timers to drive its output. This was due to the fact that, for their system, having regularly updated, partial views on the data was much more valuable than waiting until mostly complete views were ready once the watermark passed the end of the session. It also meant that lags in watermark progress due to a small amount of slow data would not affect timeliness of output for the rest of the data. This pipeline thus motivated inclusion of processing-time triggers shown in the plots 600c and 600d of FIGS. 6C and 6D, respectively.

When developing triggers, their diff detection system motivated data-driven triggers. These differs observe the stream of queries and calculate statistical estimates of whether a spike exists or not. When they believe a spike is happening, they emit a start record, and when they believe it has ceased, they emit a stop. Though a technique could drive the differ output with something periodic like Trill's punctuations, for anomaly detection, obtaining an output as soon as an anomaly is confidently discovered is ideal; the use of punctuations essentially transforms the streaming system into micro-batch, introducing additional latency. While practical for a number of use cases, it ultimately is not an ideal fit for this one, thus motivating support for custom data-driven triggers. It was also a motivating case for trigger composition, because in reality, the system runs multiple differs at once, multiplexing the output of them according to a well-defined set of logic. The AtCount trigger used in the plot 600e of FIG. 6E exemplified data-driven triggers; while the plots 600f-600j of FIGS. 6F-6J utilized composite triggers.

The future of data processing is unbounded data. Though bounded data will always have an important and useful place, it is semantically subsumed by its unbounded counterpart. Furthermore, the proliferation of unbounded data sets across modern business is staggering. At the same time, consumers of processed data grow savvier by the day, demanding powerful constructs like event-time ordering and unaligned windows. The models and systems that exist today serve as an excellent foundation on which to build the data processing tools of tomorrow, but it is of firm belief that a shift in overall mindset is necessary to enable those tools to comprehensively address the needs of consumers of unbounded data.

Based on many years of experience with real-world, massive-scale, unbounded data processing, the system 100 set forth above is a good step in that direction. The system 100 supports the unaligned, event-time-ordered windows modern data consumers require, while providing flexible triggering and integrated accumulation and refraction, and refocusing the approach from one of finding completeness in data to one of adapting to the ever present changes manifest in real-world datasets. The system 100 abstracts away the distinction of batch vs. micro-batch vs. streaming, allowing pipeline builders a more fluid choice between them, while shielding them from the system-specific constructs that inevitably creep into models targeted at a single underlying system. The overall flexibility of the system 100 allows pipeline builders to appropriately balance the dimensions of correctness, latency, and cost to fit their use case, which is critical given the diversity of needs in existence. And lastly, the system 100 clarifies pipeline implementations by separating the notions of what results are being computed, where in event time they are being computed, when in processing time they are materialized, and how earlier results relate to later refinements.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

FIG. 7 is a schematic view of an example computing device 700 that may be used to implement the systems and methods described in this document. The computing device 700 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 700 includes a processor 710 (e.g., data storage hardware), memory 720, a storage device 730, a high-speed interface/controller 740 connecting to the memory 720 and high-speed expansion ports 750, and a low speed interface/controller 760 connecting to low speed bus 770 and storage device 730. Each of the components 710, 720, 730, 740, 750, and 760, are interconnected using various busses, and may be mounted on a common motherboard or in other manners as appropriate. The processor 710 can process instructions for execution within the computing device 700, including instructions stored in the memory 720 or on the storage device 730 to display graphical information for a graphical user interface (GUI) on an external input/output device, such as display 780 coupled to high speed interface 740. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system). The data storage hardware 710 (e.g., processor) may execute the streaming computation system 100.

The memory 720 (e.g., memory hardware) stores information non-transitorily within the computing device 700. The memory 720 may be a computer-readable medium, a volatile memory unit(s), or non-volatile memory unit(s). The non-transitory memory 720 may be physical devices used to store programs (e.g., sequences of instructions) or data (e.g., program state information) on a temporary or permanent basis for use by the computing device 500. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 730 is capable of providing mass storage for the computing device 700. In some implementations, the storage device 730 is a computer-readable medium. In various different implementations, the storage device 730 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 720, the storage device 730, or memory on processor 710.

The high speed controller 740 manages bandwidth-intensive operations for the computing device 700, while the low speed controller 760 manages lower bandwidth-intensive operations. Such allocation of duties is exemplary only. In some implementations, the high-speed controller 740 is coupled to the memory 720, the display 780 (e.g., through a graphics processor or accelerator), and to the high-speed expansion ports 750, which may accept various expansion cards (not shown). In some implementations, the low-speed controller 760 is coupled to the storage device 730 and low-speed expansion port 770. The low-speed expansion port 570, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 700a or multiple times in a group of such servers 700a, as a laptop computer 700b, or as part of a rack server system 700c.

Various implementations of the systems and techniques described here can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as an application, program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other.

In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A method comprising:
   receiving, at data processing hardware, data corresponding to one of streaming data or batch data;
   determining, using the data processing hardware, a content of the received data for computation;
   determining, using the data processing hardware, an event time of the data for slicing the data;
   determining a processing time to output results of the received data using the data processing hardware;
   grouping, using the data processing hardware, a first subset of the received data into a first window, the first window defining a first sub-event time of the first data subset;
   aggregating, using the data processing hardware, a first result of the first data subset for the first window; and
   determining, by the data processing hardware, a first trigger time to:
   emit the first aggregated result of the first data subset;
   store a copy of the first aggregated result in a persistent state within memory hardware; and
   refine a next aggregate result of a later subset with the first aggregated result,
   wherein the first trigger time comprises at least one of:
   when a watermark reaches an end of the first window;
   every threshold number of seconds of a walltime;
   after receiving a punctuation record that terminates the first window;
   every threshold number of records;
   after arbitrary user logic decides to trigger; or
   after an arbitrary combination of concrete triggers.

2. The method of claim 1, further comprising:
   grouping, using the data processing hardware, later subsets of the received data into windows based on the event time, the windows comprising one of:
   fixed windows defined by a static time period, each fixed window applied across all of the data within the associated time period;
   sliding windows defined by a time period and a slide period, each sliding window applied across all of the data within the associated time period and associated with a start time separated from a start time of an immediately successive window by the slide period;
   session windows defined by a timeout gap, each session window applied across a subset of the data occurring within a span of time less than the associated timeout gap; or
   user-defined windows defined by a pair of functions.

3. The method of claim 1, further comprising:
   assigning, using the data processing hardware, a mergable window for each element of the received data, each element including an associated input timestamp and each session window extending a predefined range of time beyond the input timestamp for the associated window;
   merging, using the data processing hardware, two or more of the mergable windows belonging to a same key that overlap into a single merged window; and
   setting, using the data processing hardware, an associated output timestamp for each element to a value greater than or equal to an earliest time in the associated merged window or the associated mergeable window.

4. The method of claim 3, wherein the single merged window includes a range of time greater than the predefined range of time.

5. The method of claim 1, further comprising, when the received data corresponds to streaming data:
   grouping, using the data processing hardware, the streaming data into windows;
   setting, using the data processing hardware, an input timestamp on an element of the streaming data; and
   when the input timestamp on the element occurs earlier than a watermark, determining, using the data processing hardware, the streaming data comprises late streaming data; and
   one of:
   dropping the late streaming data; or
   allowing the late streaming data by creating a duplicate window in an output for the late streaming data.

6. The method of claim 1, further comprising:
   grouping, using the data processing hardware, a second subset of the received data into a second window, the second window defining a second sub-event time of the second data subset;

aggregating, using the data processing hardware, a second result of the second data subset for the second window; and determining, using the data processing hardware, a second trigger time to emit the second aggregated result of the second data subset, the second trigger time comprising at least one of:
  when a watermark reaches an end of the second window;
  every threshold number of seconds of a walltime;
  after receiving a punctuation record that terminates the second window;
  every threshold number of records;
  after arbitrary user logic decides to trigger; or
  after an arbitrary combination of concrete triggers.

7. The method of claim 1, further comprising, when determining the first trigger time to emit the first aggregated result of the first data subset, discarding, using the data processing hardware, the first aggregated result from use when aggregating results of later subsets of the received data.

8. The method of claim 1, further comprising:
  when determining the first trigger time to emit the first aggregated result of the first data subset, storing the copy of the first aggregated result in the persistent state within the memory hardware; and
  when the next aggregated result of the later subset associated with the same window emits:
    emitting a retraction of the first aggregated result; and
    emitting a combined session result for the first window.

9. The method of claim 1, further comprising:
  receiving, at the data processing hardware, a late data point after grouping the data subset into the first window, the late data point related to the first window; and
  discarding, using the data processing hardware, the late data point.

10. The method of claim 1, further comprising:
  receiving, at the data processing hardware, a late data point after grouping the first data subset into the first window, the late data point related to the first window; and
  accumulating, using the data processing hardware, the late data point into the first window to refine the first aggregated result with the late data point.

11. The method of claim 1, further comprising:
  receiving, at the data processing hardware, a late data point after grouping the first data subset into the first window, the late data point related to the first window;
  aggregating, using the data processing hardware, a combined result of the first data subset and the late data point; and
  emitting the combined result.

12. A system comprising:
  data processing hardware; and
  memory hardware in communication with the data processing hardware, the memory hardware storing instructions that when executed on the data processing hardware cause the data processing hardware to perform operations comprising:
    receiving data corresponding to one of streaming data or batch data;
    determining a content of the received data for computation;
    determining an event time of the data for slicing the data;
    determining a processing time to output results of the received data;
    grouping a first subset of the received data into a first window, the first window defining a first sub-event time of the first data subset;
    aggregating a first result of the first data subset for the first window;
    determining a first trigger time to:
      emit the first aggregated result of the first data subset;
      store a copy of the first aggregated result in a persistent state within the memory hardware; and
      refine a next aggregate result of a later subset with the first aggregated result,
    wherein the first trigger time comprises at least one of:
      when a watermark reaches an end of the first window;
      every threshold number of seconds of a walltime;
      after receiving a punctuation record that terminates the first window;
      every threshold number of records;
      after arbitrary user logic decides to trigger; or
      after an arbitrary combination of concrete triggers.

13. The system of claim 12, wherein the operations further comprise grouping later subsets of the received data into windows based on the event time, the windows comprising one of:
  fixed windows defined by a static time period, each fixed window applied across all of the data within the associated time period;
  sliding windows defined by a time period and a slide period, each sliding window applied across all of the data within the associated time period and associated with a start time separated from a start time of an immediately successive window by the slide period;
  session windows defined by a timeout gap, each session window applied across a subset of the data occurring within a span of time less than the associated timeout gap; or
  user-defined windows defined by a pair of functions.

14. The system of claim 12, wherein the operations further comprise:
  assigning a mergeable window for each element of the received data, each element including an associated input timestamp and each mergeable window extending a predefined range of time beyond the input timestamp for the associated window;
  merging two or more of the mergeable windows belonging to a same key that overlap into a single merged window; and
  setting an associated output timestamp for each element to a value greater than or equal to an earliest time in the associated merged window or the associated mergeable window.

15. The system of claim 14, wherein the single merged window includes an associated range of time greater than the predefined range of time.

16. The system of claim 12, wherein the operations further comprise, when the received data corresponds to streaming data:
  grouping the streaming data into windows;
  setting an input timestamp on an element of the streaming data; and
  when the input timestamp on the element occurs earlier than a watermark:
    determining the streaming data comprises late streaming data; and one of:

dropping the late streaming data; or
allowing the late streaming data by creating a duplicate window in an output for the late streaming data.

17. The system of claim 12, wherein the operations further comprise:
grouping a second subset of the received data into a second window, the second window defining a second sub-event time of the second data subset;
aggregating a second result of the second data subset for the second window; and
determining a second trigger time to emit the second aggregated result of the second data subset, the second trigger time comprising at least one of:
when a watermark reaches an end of the second window;
every threshold number of seconds of a walltime;
after receiving a punctuation record that terminates the second window;
every threshold number of records;
after arbitrary user logic decides to trigger; or
after an arbitrary combination of concrete triggers.

18. The system of claim 12, wherein the operations further comprise, when determining the first trigger time to emit the first aggregated result of the first data subset, discarding the first aggregated result from use when aggregating results of later subsets of the received data.

19. The system of claim 12, wherein the operations further comprise:
when determining the first trigger time to emit the first aggregated result of the first data subset, storing the copy of the first aggregated result in the persistent state within the memory hardware; and
when the next aggregated result of the later subset associated with the same window emits:
emitting a retraction of the first aggregated result; and
emitting a combined session result for the first window.

20. The system of claim 12, wherein the operations further comprise:
receiving a late data point after grouping the first data subset into the first window, the late data point related to the first window; and
discarding the late data point.

21. The system of claim 17, wherein the operations further comprise:
receiving a late data point after grouping the first data subset into the first window, the late data point related to the second window; and
accumulating the late data point into the first window to refine the first aggregated result with the late data point.

22. The system of claim 17, wherein the operations further comprise:
receiving a late data point after grouping the first data subset into the first window, the late data point related to the first window;
aggregating a combined result of the first data subset and the late data point; and
emitting the combined result.

* * * * *